United States Patent
Watanabe et al.

(10) Patent No.: US 7,418,146 B2
(45) Date of Patent: Aug. 26, 2008

(54) IMAGE DECODING APPARATUS

(75) Inventors: Tsuyoshi Watanabe, Gifu (JP); Shigeyuki Okada, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 681 days.

(21) Appl. No.: 11/054,537

(22) Filed: Feb. 10, 2005

(65) Prior Publication Data
US 2005/0175250 A1    Aug. 11, 2005

(30) Foreign Application Priority Data
Feb. 10, 2004  (JP) ............... 2004-034081
Mar. 24, 2004  (JP) ............... 2004-087720

(51) Int. Cl.
*G06K 9/36* (2006.01)
*G06K 9/46* (2006.01)

(52) U.S. Cl. ............... 382/247; 382/233; 382/238; 382/247; 382/240; 382/246; 341/107

(58) Field of Classification Search ......... 382/232–233, 382/238, 244, 247, 246, 240, 250–252; 358/426.01–426.16; 375/240.01–240.16; 341/107, 341/50
See application file for complete search history.

(56) References Cited

U.S. PATENT DOCUMENTS 6,014,463 A * 1/2000 Hirabayashi ............... 382/232
6,263,024 B1 * 7/2001 Matsumoto ............ 375/240.16
2001/0024524 A1 * 9/2001 So et al. ..................... 382/238
2003/0007697 A1 * 1/2003 Kadono ..................... 382/247

FOREIGN PATENT DOCUMENTS

JP    2001-189661    7/2001
JP    2003-032498    1/2003

* cited by examiner

*Primary Examiner*—Matthew C. Bella
*Assistant Examiner*—Ali Bayat
(74) *Attorney, Agent, or Firm*—McDermott Will & Emery LLP

(57) ABSTRACT

Coded data are inputted from a stream analyzing unit to an entropy decoding unit. A group of peripheral information registers stores peripheral information on a target pixel for estimating a context used for arithmetic decoding of the coded data. Based on the peripheral information stored in the group of peripheral registers, a context estimation unit estimates a context and delivers the estimated context to an arithmetic decoding unit. The arithmetic decoding unit decodes the coded data based on a context label, then derives a decision and supplies the decision to an inverse quantization unit. The peripheral information stored in the group of peripheral registers is updated by a decoding result of the arithmetic decoding unit in the same cycle as the decoding.

6 Claims, 25 Drawing Sheets

FIG.5

| $d_0$ | $v_0$ | $d_1$ |
|---|---|---|
| $h_0$ | X | $h_1$ |
| $d_2$ | $v_1$ | $d_3$ |

FIG.6

| LH AND LL SUB-BANDS | | | HL SUB-BAND | | | HH SUB-BAND | | CX |
|---|---|---|---|---|---|---|---|---|
| $\Sigma h$ | $\Sigma v$ | $\Sigma d$ | $\Sigma h$ | $\Sigma v$ | $\Sigma d$ | $\Sigma h + \Sigma v$ | $\Sigma d$ | |
| 2 | – | – | – | 2 | – | – | $\geq 3$ | 8 |
| 1 | $\geq 1$ | – | $\geq 1$ | 1 | – | $\geq 1$ | 2 | 7 |
| 1 | 0 | $\geq 1$ | 0 | 1 | $\geq 1$ | 0 | 2 | 6 |
| 1 | 0 | 0 | 0 | 1 | 0 | $\geq 2$ | 1 | 5 |
| 0 | 2 | – | 2 | 0 | – | 1 | 1 | 4 |
| 0 | 1 | – | 1 | 0 | – | 0 | 1 | 3 |
| 0 | 0 | $\geq 2$ | 0 | 0 | $\geq 2$ | $\geq 2$ | 0 | 2 |
| 0 | 0 | 1 | 0 | 0 | 1 | 1 | 0 | 1 |
| 0 | 0 | 0 | 0 | 0 | 0 | 0 | 0 | 0 |

FIG.7

| $v_0 (h_0)$ \ $v_1 (h_1)$ | SIGNIFICANT | | INSIGNIFICANT |
|---|---|---|---|
| | + | – | |
| SIGNIFICANT + | 1 | 0 | 1 |
| SIGNIFICANT – | 0 | –1 | –1 |
| INSIGNIFICANT | 1 | –1 | 0 |

FIG.8

| h | v | CX |
|---|---|----|
| 1 | 1 | 13 |
|   | 0 | 12 |
|   | -1 | 11 |
| 0 | 1 | 10 |
|   | 0 | 9 |
|   | -1 | 10 |
| -1 | 1 | 11 |
|   | 0 | 12 |
|   | -1 | 13 |

FIG.9

| Σh+Σv+Σd | BECAME SIGNIFICANT IN A PLANE RIGHT ABOVE | CX |
|---|---|---|
| - | false | 16 |
| ≧1 | true | 15 |
| 0 | true | 14 |

FIG.10

| | CX |
|---|---|
| RUN LENGTH | 17 |
| UNIFORM | 18 |

FIG.19A

| [SOC] | Start of codestream | ff4f |
|---|---|---|
| [SIZ] | Image and tile size | ff51... |
| [COD] | Coding style default | ff52... |
| [QCD] | Quantization default | ff5c... |
| [PPM] | Packet packet headers, main header | ff60... |
| [HEADERS OF ALL PACKETS] | | |
| [SOT] | Start of tile-part | ff90... |
| [SOD] | Start of data | ff93... |
| [DATA OF ALL PACKETS] | | |
| [EOC] | End of codestream | ffd9 |

FIG.19B

| [SOC] | Start of codestream | ff4f |
|---|---|---|
| [SIZ] | Image and tile size | ff51... |
| [COD] | Coding style default | ff52... |
| [QCD] | Quantization default | ff5c... |
| [SOT] | Start of tile-part | ff90... |
| [SOD] | Start of data | ff93... |
| [HEADER OF FIRST PACKET] | | |
| [DATA OF FIRST PACKET] | | |
| [HEADER OF SECOND PACKET] | | |
| [DATA OF SECOND PACKET] | | |
| ⋮ | | |
| [HEADER OF n-th PACKET] | | |
| [DATA OF n-th PACKET] | | |
| [EOC] | End of codestream | ffd9 |

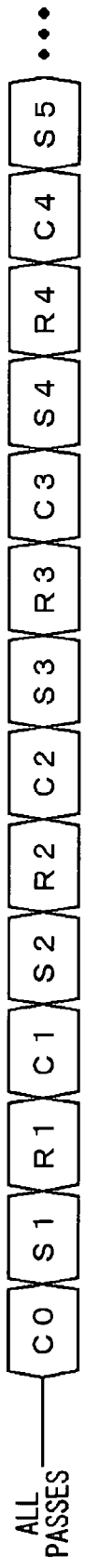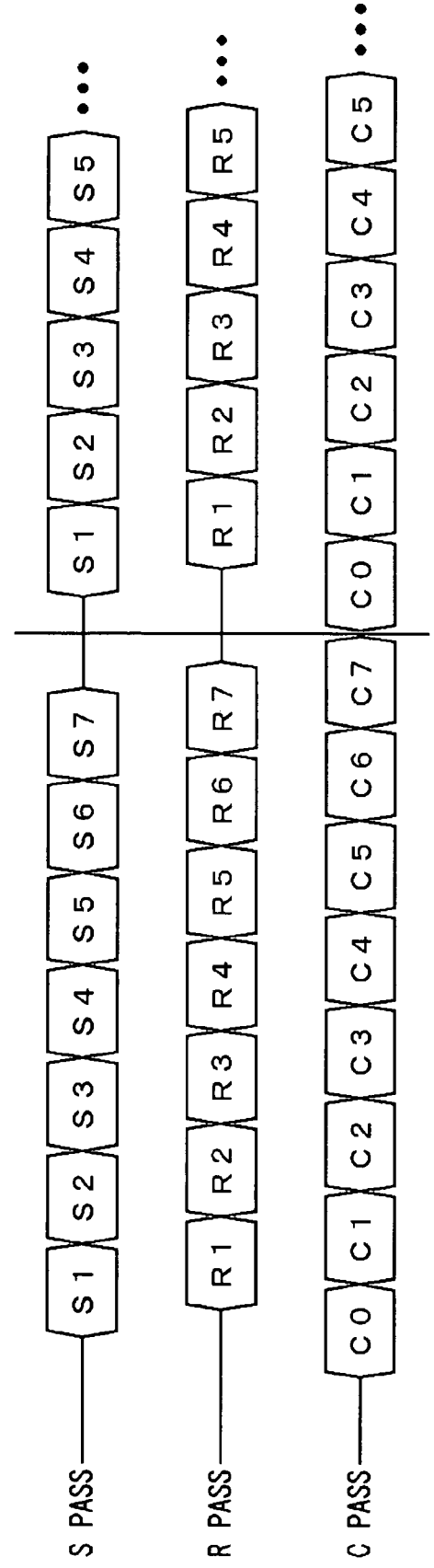
FIG.21A
FIG.21B

IMAGE DECODING APPARATUS

BACKGROUND OF THE INVENTION

1. Field of the Invention

The present invention relates to image decoding apparatus, and it particularly relates to a decoding apparatus for decoding coded image data that contain a group of data having a plurality of properties.

2. Description of the Related Art

At ISO/ITU-T, JPEG2000 using a discrete wavelet transform (DWT) is being standardized as a successor to JPEG (Joint Photographic Expert Group), which is a standard technology for compression and coding of still images. In JPEG2000, a wide range of image quality, from low bit-rate coding to lossless compression, can be coded highly efficiently, and a scalability function, in which the image quality is gradually raised, can be realized easily.

The coding processing in JPEG2000 includes block division processing, coefficient bit modeling processing and arithmetic coding processing. In block division processing, sub-bands generated by performing a discrete wavelet transform on an original image are each divided into small regions called code-blocks. In coefficient bit modeling processing, binary symbols and contexts for arithmetic coding are generated by decomposing the quantized values of wavelet transform coefficients into bit-planes from the most significant bit (MSB) to the least significant bit (LSB). In arithmetic coding processing, entropy coding is carried out according to the occurrence probability of a symbol sequence based on the generated symbol and context.

In this manner, arithmetic coding processing requires input of a context in addition to data to be coded. Reference (1) in the following Related Art List discloses an arithmetic coding apparatus and an arithmetic decoding apparatus structured such that a plurality of candidates for possible context are prepared and a selection is made by a selector according to the result of arithmetic coding.

Also, in the processing of arithmetic coding processing, coding is carried out by dividing the bit-planes for each pass as disclosed in Reference (2) in the following Related Art List.

Related Art List
(1) Japanese Patent Publication No. 3406550.
(2) Japanese Patent Application Laid-Open No. 2003-32496.

Parallel processing is necessitated if faster coding and decoding in JPEG2000 scheme are to be realized. In JPEG2000 arithmetic coding, peripheral information on pixels needs to be provided for the determination of a context. In the case of coding, data on all the pixels are already known, and therefore all the necessary peripheral information is ready, which facilitates parallel and faster processing. In decoding, however, peripheral information on pixels is not known until decoding is actually done, so that it is difficult to implement parallelization and the processing must be done sequentially.

With an arithmetic decoding apparatus disclosed in Reference (1), while there are candidates for context prepared beforehand, selection of a candidate for the context involves complex control. Another problem with this apparatus is that parallel processing with it may result in an exponential increase in the number of candidates for context, which in turn causes an increase in circuitry scale and complexity of control.

There are two computing methods for arithmetic coding for each pass, namely, one for computing independently for each pass and the other for computing across two passes. For data coded by the former method, decoding can be carried out independently for each pass. On the other hand, for data coded by the latter method, decoding cannot be carried out independently for each pass. Nevertheless, decoding processing must be done in parallel if it is to be performed at high speed.

SUMMARY OF THE INVENTION

The present invention has been made in view of the foregoing circumstances and problems, and an object thereof is to provide an image decoding technology capable of decoding at high speed. Another object thereof is to provide an image decoding technology that facilitates parallelization. Still another object thereof is to provide an image decoding technology that has high versatility of uses.

A preferred embodiment according to the present invention relates to an image decoding apparatus. This apparatus includes: a peripheral information register which stores peripheral information on a pixel when the pixel is decoded; a context estimation unit which generates context information for estimating a decoding result of the pixel by reading out the peripheral information from the peripheral information register; and a decoding unit which decodes the pixel from the context information generated by the context estimation unit and coded data of the pixel, wherein the decoding unit decodes one pixel for each unit decoding period and at the time of termination of the each unit decoding period the decoding unit updates the peripheral information by the decoding result of the pixel that has been decoded during the unit decoding period and then writes back the updated peripheral information to the peripheral information register. The decoding unit may be, for instance, one that performs arithmetic decoding on pixels.

Another preferred embodiment according to the present invention relates also to an image decoding apparatus. This apparatus comprises: an entropy decoding block which entropy-decodes a coded image; an inverse quantization unit which inverse-quantizes entropy-decoded data; and an inverse transform unit which performs a spatial-frequency inverse-transform on the inverse-quantized data. The entropy decoding block includes: a peripheral information register which stores peripheral information on a pixel when the pixel is decoded; a context estimation unit which generates context information for estimating a decoding result of the pixel by reading out the peripheral information from the peripheral information register; and a decoding unit which decodes the pixel from the context information generated by the context estimation unit and coded data of the pixel, wherein the decoding unit decodes one pixel for each unit decoding period and at the time of termination of the each unit decoding period the decoding unit updates the peripheral information by the decoding result of the pixel that has been decoded during the unit decoding period and then writes back the updated peripheral information to the peripheral information register.

The peripheral information register may store peripheral information on an entire pixel block to be processed, may have output bus width which is less than a bit number of the peripheral information to be stored and may store the peripheral information by a ring buffer scheme so that necessary peripheral information is read out sequentially.

In a certain unit decoding period the context estimation unit may generate, in advance, context information needed in a next unit decoding period and store the thus generated context information. The apparatus may include a decoding position calculation unit which specifies a pixel to be decoded, based on the peripheral information, wherein a decoding processing of a pixel for which a decoding processing is not necessary may be skipped.

A plurality of the context estimation units and a plurality of the decoding units may be provided for a parallel processing, and the peripheral information register may be shared by the plurality of context estimation units and the peripheral information stored may be updated by decoding results of the plurality of decoding units in the respective unit decoding periods.

The peripheral information register may be provided with a shifter which stores part of peripheral information stored at a storage position other than a position read out by a ring buffer scheme, and the context estimation unit may read out the part of peripheral information by delivering an instruction about a shift amount to the shifter.

Each of the plurality of context estimation units and each of the plurality of decoding units may carry out a decoding processing in units of pass corresponding to a plurality of coding passes in a coded image, and the apparatus may further include a control unit which controls operation timing of a decoding processing in each pass so that a position of the peripheral information register referred to in the decoding processing in the each pass is distant apart by a predetermined number of pixels.

Still another preferred embodiment according to the present invention relates also to an image decoding apparatus. This apparatus includes: a first decoding unit and at least one second decoding unit which decode coded image data and differ from each other in specifications about data of a decodable property in the coded data; and an analyzing unit which analyzes whether the coded image data can be decoded in parallel or not, wherein the analyzing unit selects either for the first decoding unit to decode independently the coded image data in accordance with a result of analysis or for a plurality of decoding units including the first decoding unit and/or the at least one second decoding unit to decode the coded image data in parallel. The first coding unit and the second coding unit may be, for instance, one that performs arithmetic decoding on pixels.

By employing a structure according to this preferred embodiment, when a parallel processing of coded image data is possible, the coded image data are decoded by a plurality of decoding units in parallel. Thus, the decoding processing can be carried out at high speed. Even if the parallel processing is not possible, the first decoding unit of high specifications carries out the decoding processing independently, so that the high versatility of uses is achieved.

Still another preferred embodiment according to the present invention relates also to an image decoding apparatus. This apparatus comprises: an entropy decoding block which entropy-decodes a coded image; an inverse quantization unit which inverse-quantizes entropy-decoded data; and an inverse transform unit which performs a spatial-frequency inverse-transform on the inverse-quantized data, the entropy decoding block including: a first decoding unit and at least one second decoding unit which decode coded image data and differ from each other in specifications about data of a decodable property in the coded data; and an analyzing unit which analyzes whether the coded image data can be decoded in parallel or not, wherein the analyzing unit selects either for the first decoding unit to decode independently the coded image data in accordance with a result of analysis or for a plurality of decoding units including the first decoding unit and/or the at least one second decoding unit to decode the coded image data in parallel.

There may be provided a plurality of decoding units each of which is comprised of the first decoding unit and the at least one second decoding unit. Thereby, the decoding processing can be performed faster.

When a decoding processing is performed in parallel, the first decoding unit may decode data having a certain property exclusively. The first decoding unit may carry out two modes, namely, a first mode by which to decode the coded image data independently if a parallel processing is not possible and a second mode by which to decode data of a certain property exclusively if the parallel processing is implemented. According to this structure and operation achieved thereby, the first decoding unit is provided with a function of exclusively decoding data of a certain property and this function accounts for part of the second decoding unit, so that the number of the second decoding units can be reduced by one. Thus, this structure contributes to both further speed-up and the reduction of circuit area.

The analyzing unit may analyze whether a plurality of data groups classified by each of the properties described in a header of the coded image data are respectively coded independently or not. Moreover, the analyzing unit may analyze whether a code amount of each of a plurality of data groups classified by each of the properties is described in a header of the coded image data or not. Accordingly, by analyzing the information described in the header of coded image data, whether the coded imaged data can be processed in parallel or not can be determined. If a group of data is not coded independently, a parallel processing is not possible. Moreover, if the code amount of the group of data is not described, the parallel processing is not possible, either.

The "property" may be a type of coding pass of the coded image data. The "coding pass" includes passes that conform to the JPEG2000 specifications.

It is to be noted that any arbitrary combination of the above-described structural components and expressions changed among a method, an apparatus, a system, a computer program, a recording medium and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

FIG. 5 illustrates neighbor coefficients that surround a coefficient in a bit-plane.

FIG. 6 is a table for classifying contexts in an S pass processing.

FIG. 7 illustrates a vertical-index and horizontal-index table for determining a context of polarity bit.

FIG. 8 is a classification table for classifying contexts relative to polarity bits.

FIG. 9 is a classification table for classifying contexts in an R pass processing.

FIG. 10 is a classification table for classifying contexts in a C pass processing.

FIGS. 19A and 19b show examples of file structure of JPEG2000.

FIGS. 21A and 21B are timing charts showing the decoding timing of codestreams of the respective passes.

DETAILED DESCRIPTION OF THE INVENTION

The invention will now be described based on the preferred embodiments, which do not intend to limit the scope of the present invention, but exemplify the invention. All of the features and the combinations thereof described in the embodiments are not necessarily essential to the invention.

First Embodiment

Figure 1:
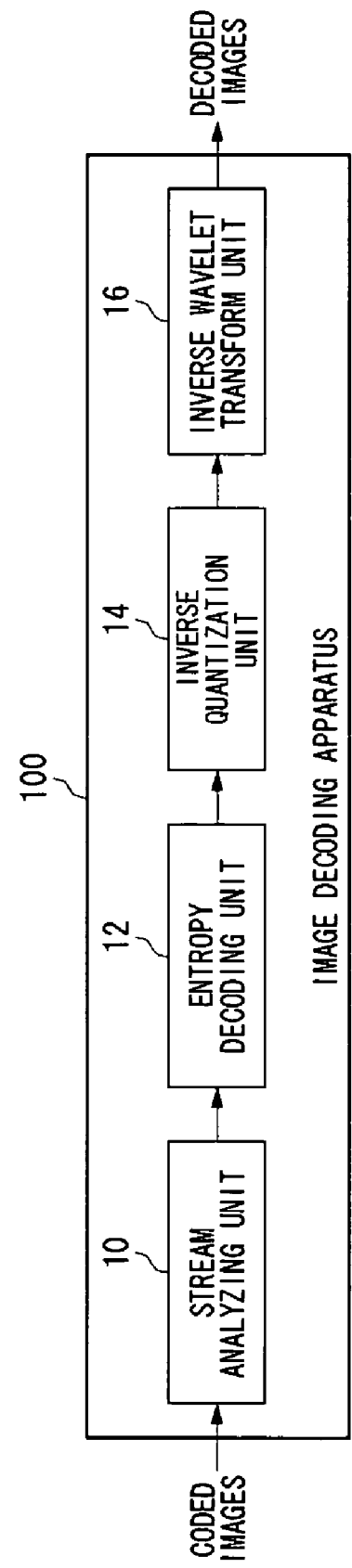
FIG. 1 illustrates a structure of an image decoding apparatus according to a first embodiment of the present invention.

FIG. 1 illustrates a structure of an image decoding apparatus 100 according to a first embodiment of the present invention. In terms of hardware, this structure of image decoding apparatus 100 can be realized by a CPU, a memory and other LSIs of an arbitrary computer. In terms of software, it can be realized by memory-loaded programs which have decoding functions or the like, but drawn and described herein are function blocks that are realized in cooperation with those. Thus, it is understood by those skilled in the art that these function blocks can be realized in a variety of forms such as by hardware only, software only or the combination thereof.

The image decoding apparatus 100 receives the input of images that have been compressed and coded, decodes the inputted coded images and then outputs the decoded images. The coded images are produced in the following manner. That is, an original image is recursively divided into four frequency sub-bands and is then subjected to a wavelet transform so as to generate wavelet transform coefficients. After quantizing the wavelet transform coefficients, they are subjected to arithmetic coding so as to derive a coded image. For example, there are coded images that conform to JPEG2000 standard.

The coded images inputted to the image decoding apparatus 100 may be coded frames of moving images. The image decoding apparatus 100 reproduces the moving images by decoding sequentially each coded frame of the moving images which are being inputted as a codestream.

A stream analyzing unit 10 analyzes the inputted coded images and extracts coded data, and supplies the extracted coded data to an entropy decoding unit 12. The entropy decoding unit 12 entropy-decodes the coded data bit-plane by bit-plane and supplies to an inverse quantization unit 14 the quantized wavelet coefficients obtained as a result of the decoding.

An inverse quantization unit 14 inverse-quantizes the quantized values of the wavelet transform coefficients and supplies them to an inverse wavelet transform unit 16. The inverse wavelet transform unit 16 performs an inverse wavelet transform on the inverse-quantized wavelet transform coefficients and outputs a decoded image thus obtained.

Figure 2:
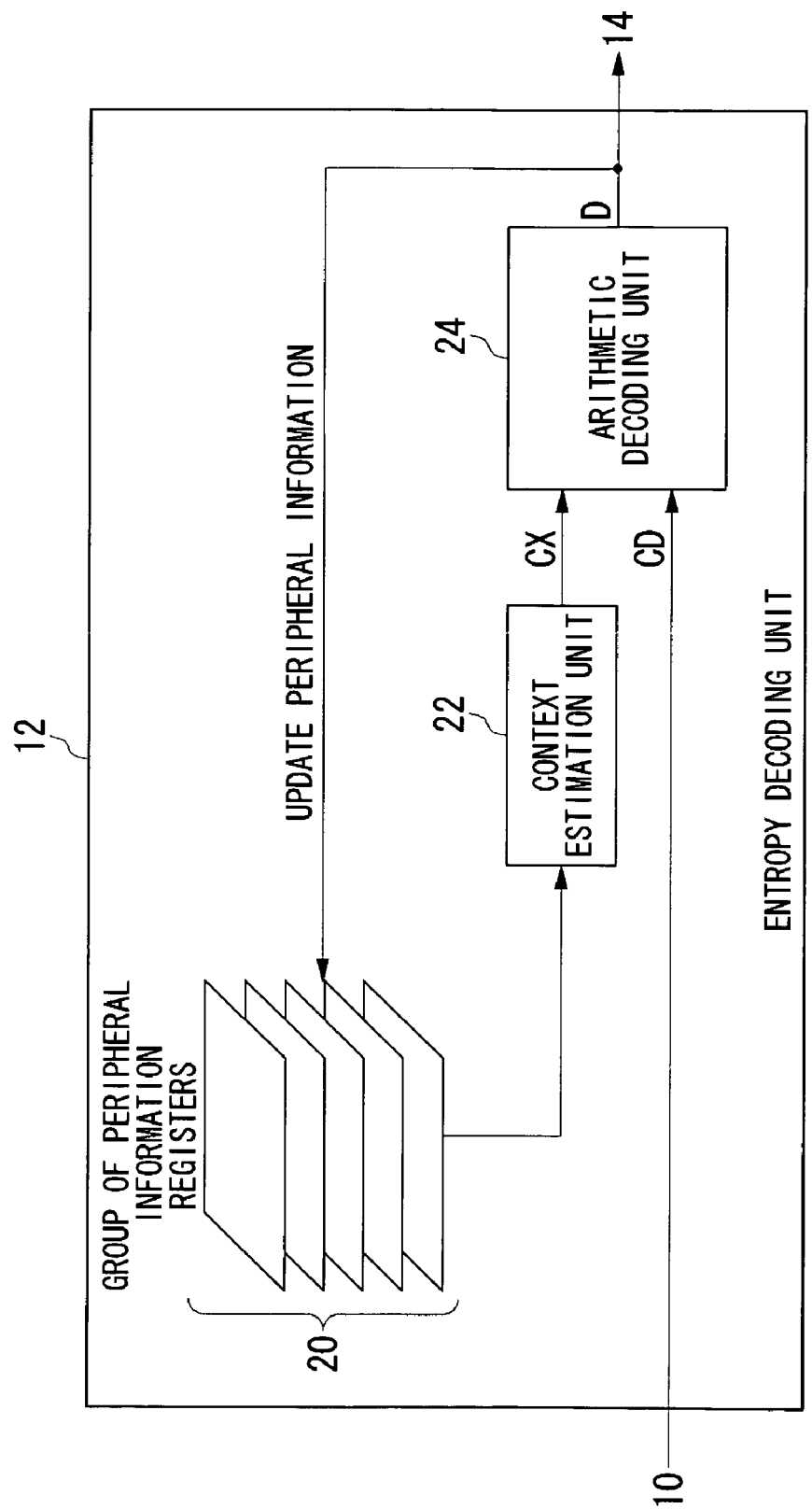
FIG. 2 illustrates a structure of an entropy decoding unit shown in FIG. 1.

FIG. 2 illustrates a structure of the entropy decoding unit 12. Coded data CD are inputted from the stream analyzing unit 10 to the entropy decoding unit 12. A group of peripheral information registers 20 is a set of a plurality of registers that store peripheral information on a target pixel for estimating a context used in arithmetic decoding of the coded data CD. A context estimation unit 22 estimates a context for predicting a decoding result of the coded data CD, based on the peripheral information stored in the group of peripheral information registers 20, and supplies a context label CX to an arithmetic decoding unit 24.

The arithmetic decoding unit 24 receives the inputs of coded data CD and context label CX from the stream analyzing unit 10 and the context estimation unit 22, respectively, derives from an arithmetic decoding operation a decision D which is a binary decision value, and supplies the decision D to the inverse quantization unit 14. The decision D outputted from the arithmetic decoding unit 24 is inputted to the group of peripheral information registers 20 at the time of termination of a unit decoding period, namely, in the same cycle as decoding, and the peripheral information stored in the group of peripheral information registers 20 is updated using a result of operation by the arithmetic decoding unit 24.

The context estimation unit 22 carries out a coefficient bit modeling processing when a decoding is done in JPEG2000. The coefficient bit modeling processing at a decoding is a processing that determines a context necessary for an arithmetic decoding while the peripheral information is being updated utilizing a decoding result of the arithmetic decoding unit. Hereinbelow, with reference to FIG. 3 to FIG. 10, the coefficient bit modeling processing at a decoding will be described.

A sub-band image extracted from a codestream by the stream analyzing unit 10 is divided into smaller regions which are called "code-blocks", and this code-block constitutes a unit of decoding processing. The sub-band image is any of the following four sub-bands, namely, an LL sub-band which has low-frequency components in both x and y directions of an original image, an HL sub-band and an LH sub-band which have a low-frequency component in one of the x and y directions and a high-frequency component in the other, and an HH sub-band which has high-frequency component in both x and y directions.

The size of a code-block is an integer value of a power of 2 in which the height and the width are in a range of $2^2$ to $2^{10}$. And the height and the width are defined by the standard such that the sum of exponential of the height and the width is less than or equal to 12. It is assumed in the present embodiment that a code-block is of 32 pixels each in the vertical and horizontal directions.

Figure 3:
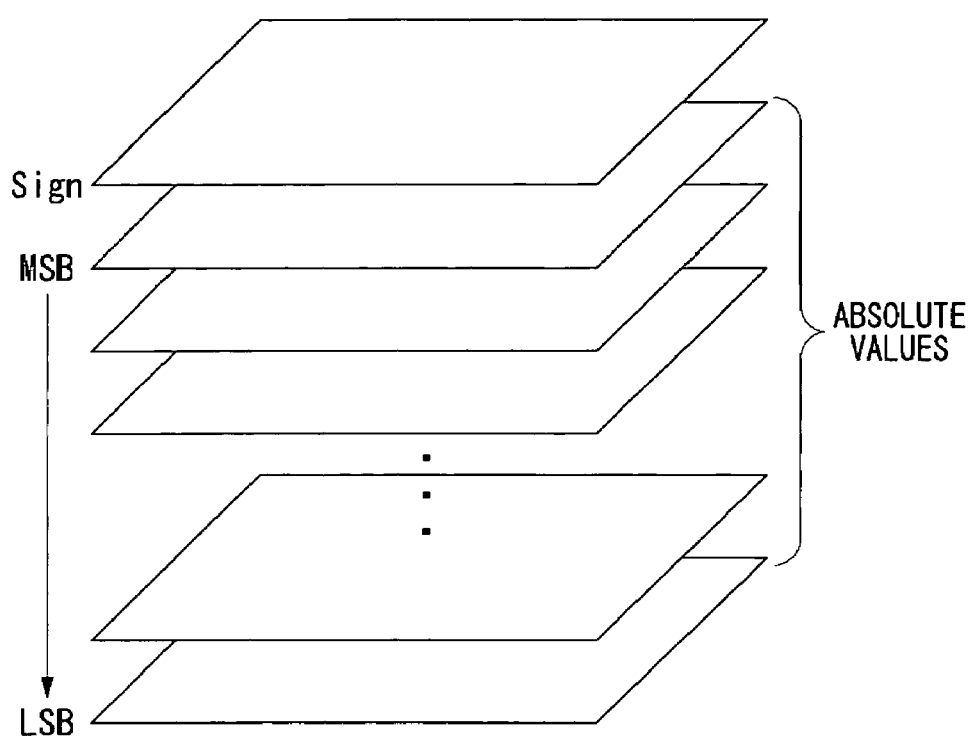
FIG. 3 illustrates bit-planes of a code-block on which a decoding processing performed in an entropy decoding unit shown in FIG. 2.

FIG. 3 illustrates bit-planes formed in such a manner that a code-block is sliced bit by bit. The bit-planes in a code-block are composed of a SIGN plane which stores positive and negative signs of quantized values of wavelet transform coefficients, and a plurality of planes of MSB to LSB that supply absolute values of quantized values of wavelet transform coefficients. The entropy decoding unit 12 selects bit-planes sequentially from high-order bit, and performs decoding on each coefficient on a bit-plane in units of bit-plane.

Figure 4:
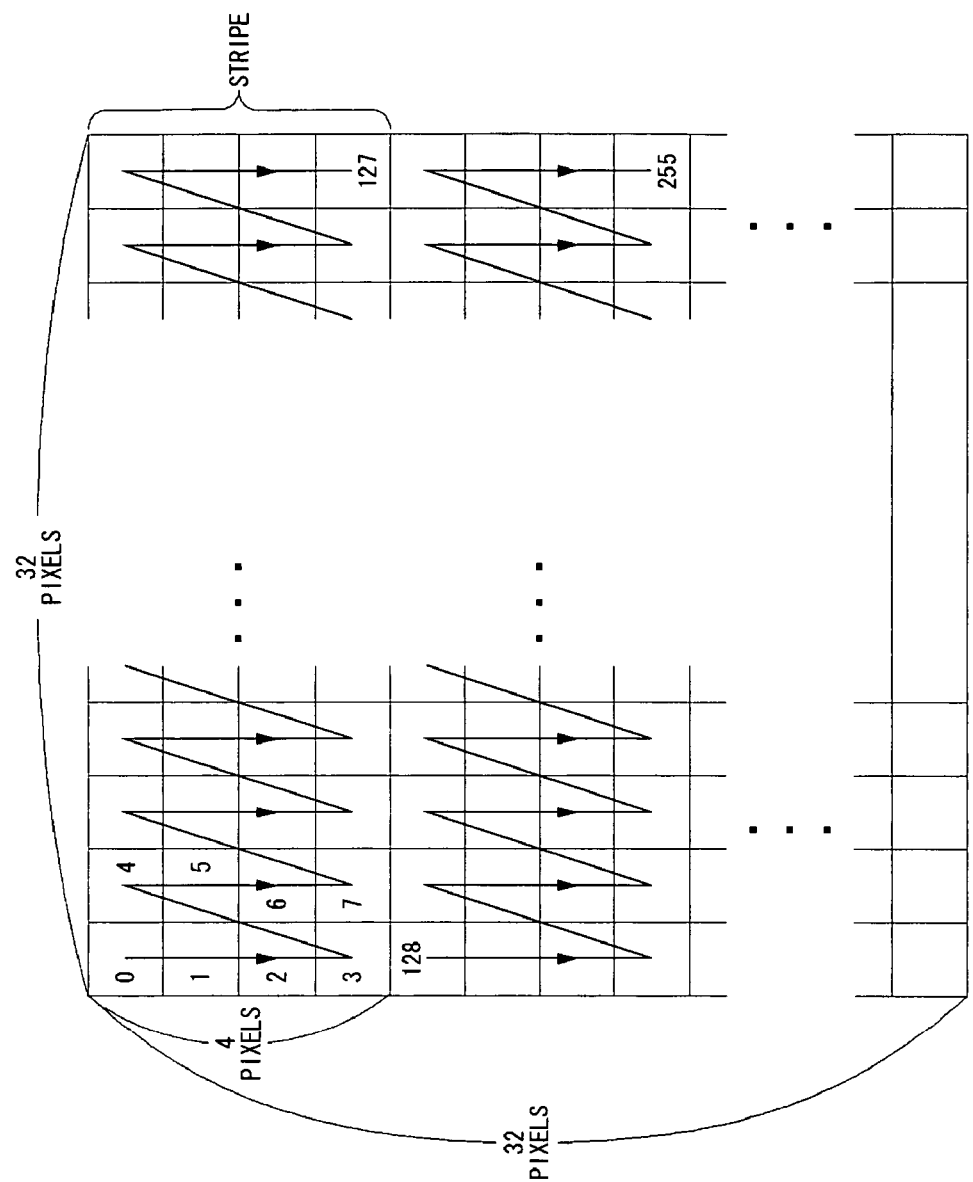
FIG. 4 illustrates a scanning sequence when coefficients on a bit-plane are to be decoded.

FIG. 4 illustrates a scanning sequence when the coefficients on a bit-plane are to be decoded. The bit-plane is divided into stripes having 4 pixels in the vertical direction, and it is scanned in units of stripe so as be decoded. The width, in the horizontal direction, of each strip is identical to that of a code-block, and is 32 pixels in this example shown in FIG. 4. Thus, the number of stripes here will be eight in total.

The decoding processing proceeds pixel by pixel in such a manner that four pixels in the vertical direction of the first column are scanned as shown by arrows in order from the top, then another four pixels in the vertical direction of the second column are scanned in the same direction and this process will be repeated until the last column. When decoding processing reaches and covers the end of a stripe, the decoding processing proceeds in the same manner from the top of the next stripe and this will be repeated until the last row of a code-block. It is to be noted that the decoding of the SIGN plane that stores the positive and negative signs of coefficients is done as appropriate when a plane corresponding to an absolute value portion of a coefficient is decoded.

Each coefficient within a code-block is identified by one of two states, namely, a significant state or an insignificant state. "1" is assigned when significant whereas "0" is assigned when insignificant, so that the significance state for each coefficient is identified using two values. At the start of a decoding, all the coefficients within a code-block are insignificant.

Here, that a coefficient is significant is a state in which the quantized value of a targeted wavelet transform coefficient is known to be non-zero from a result of decoding processing thus far. In other words, it is the state of a wavelet transform coefficient in which a bit bearing "1" has been found during the course of carrying out scanning and then decoding sequentially from a high-order bit-plane in units of stripe. That a coefficient is insignificant is a state in which the quantized value of a targeted wavelet transform coefficient is "0" or has still a probability of being "0". In other words, it is the state of a wavelet transform coefficient in which a bit bearing "1" has not yet been found during the course of carrying out decoding sequentially from a high-order bit-plane in units of stripe.

In the coefficient bit modeling processing, the context is determined, for each coefficient bit, based on a significance state of coefficients that surround a coefficient in a bit-plane. FIG. 5 illustrates eight neighbor coefficients that surround a coefficient X (hereinafter referred to as current coefficient X) and lie adjacent to each other. The eight surrounding neighbor coefficients are composed of two coefficients $h_0$ and $h_1$ that lie adjacent to the current coefficient X in the horizontal direction, two coefficients $v_0$ and $v_1$ that lie adjacent thereto in the vertical direction and four coefficients $d_0$ to $d_3$ that lie diagonally adjacent thereto.

Since each of the eight surrounding neighbor coefficients shown in FIG. 5 can have one of two states of being significant and insignificant, a current coefficient X can have 256 possible contexts as a result of the total number of combinations. However, the number of combinations is clustered into 19 types of contexts in JPEG2000 making use of the symmetry and the like, and these contexts are identified by labeling them with the numbers 0 to 18. If any of the surrounding neighbor coefficients is positioned outside an in-process code-block, the processing will be done regarding such a coefficient as being insignificant.

Each coefficient bit within a bit-plane is decoded based on one of three types of processing passes that are S pass (significance propagation pass), R pass (magnitude refinement pass) and C pass (cleanup pass). In S pass, insignificant coefficients each surrounded by significant coefficients are decoded. In R pass, significant coefficients are decoded. In C pass, the remaining coefficients are decoded.

Each processing pass has a degree of contribution to the image quality of an image increased in the order of S pass, R pass and C pass. The respective processing passes are executed in this order and the context of each coefficient is determined in consideration of information on the surrounding neighbor coefficients. A specific processing procedure for each processing pass will be described hereinbelow. The S pass processing will be described first.

When in the scanning of each stripe of a bit-plane the current coefficient X is in the state of being insignificant and among eight neighbor coefficients that lie adjacent to said current coefficient X at least one of the surrounding neighbor coefficients is in the state of being significant, the current coefficient X is selected as the coefficient to be processed in S pass. Otherwise, the coefficient will not be considered for the process in S pass. The coefficients to be decoded in S pass will be those that are most likely to become significant in the bit-plane.

The context estimation unit 22 evaluates $\Sigma h_i$ ($=h_0+h_1$) which provides the number of significant coefficients in two surrounding neighbor coefficients $h_0$ and $h_1$ in the horizontal direction relative to a current coefficient X, $\Sigma v_i$ ($=v_1+v_2$) which provides the number of significant coefficients in two surrounding neighbor coefficients $v_0$ and $v_1$ in the vertical direction relative to the current coefficient X and $\Sigma d_i$ ($=d_1+d_2+d_3+d_4$) which provides the number of significant coefficients in four surrounding neighbor coefficients $d_0$, $d_1$, $d_2$ and $d_3$ in the diagonal directions relative to the current coefficient X.

FIG. 6 is a classification table for classifying contexts in S pass. In this classification table, the combination of the number of significant neighbor coefficients $\Sigma h_i$, $\Sigma v_i$ and $\Sigma d_i$ in the horizontal, vertical and diagonal directions, respectively, is associated to nine types of context labels CX which are identified by labels 0 to 8, based on which sub-band (LH/LL sub-band, HL sub-band or HH sub-band) an in-process code-block belongs to. The context estimation unit 22 refers to this classification table for classifying contexts, classifies into any one of nine types of contexts the coefficient that is to be processed by S pass, according to the combination of the direction of a sub-band's frequency component and the number of significant neighbor coefficients $\Sigma h_i$, $\Sigma v_i$ and $\Sigma d_i$, and then outputs a context label X that corresponds to the thus classified context.

When the bit value of the current coefficient X is "1" in S pass, the significance state of the current coefficient X is changed from "insignificant" to "significant". When the current coefficient X becomes significant, a polarity bit that indicates the sign of the current coefficient X is decoded continuously.

A context for a polarity bit is determined in the following two steps based on the significance state of two vertically surrounding neighbor coefficients $v_0$ and $v_1$ and two horizontally surrounding neighbor coefficients $h_0$ and $h_1$ and a polarity value of the sign.

FIG. 7 illustrates a vertical-index and horizontal-index table for determining a context of polarity bit. The context estimation unit 22 first determines if the two vertical neighbor coefficients $v_0$ and $v_1$ are each significant positive coefficient, significant negative coefficient or insignificant coefficient, and assigns a vertical index v with one of three values consisting of "0", "1" and "−1" by referring to the table of FIG. 7. In the similar manner, the context estimation unit 22 assigns horizontal index h, for the two horizontal neighbor coefficients $h_0$ and $h_1$, with one of three values consisting of "0", "1" and "−1".

FIG. 8 is a table in which the combination of horizontal index h and vertical index v is associated to context label CX for five types of polarity bits identified by labels 9 to 13. The context estimation unit 22 refers to the table of FIG. 8, classifies the polarity bits into any one of the five types of contexts by the combination of horizontal index h and vertical index v derived, and outputs a relevant context label CX.

Next, the R pass processing will be described. When the current coefficient X has already been determined "significant", the current coefficient X will be a processing object of R pass in an in-process bit-plane. However, coefficients changed to the significant state in said bit-plane in S pass immediately prior thereto does not become a processing object. A decoding processing of R pass has a role to enhance the degree of accuracy of coefficients that have been decoded in S pass.

FIG. 9 is a classification table for classifying contexts in R pass. In R pass, the context estimation unit 22 evaluates a value of $\Sigma h_i + \Sigma v_i + \Sigma d_i$ which indicates the number of significant coefficients in eight neighbor coefficients that surround the current coefficient X. The context estimation unit 22 then determines whether the current coefficient X becomes significant in the right-above bit-plane or not, that is, determines whether or not said R pass in question is the first pass after the current coefficient has changed from an insignificant state to a significant state. Based on these results, it classifies the contexts into three types of contexts identified by labels 14 to 16 as shown in FIG. 9.

Now, the C pass processing will be described. C pass is used when the current coefficient X is not selected as a processing object in S pass and R pass. In C pass, a run-length decoding or a decoding processing in which the eight surround neighbor coefficients are referred to as in S pass is carried out. In C pass, a processing proceeds while whether the run-length decoding is to be carried out or not is being determined.

FIG. 10 is a classification table for classifying contexts in C pass. In C pass, the condition that four vertically contiguous coefficients in the vertical direction are all insignificant, that is, all four coefficients in a column within the stripe belong to C pass, as well as no significant coefficient exists among eight neighbor coefficients surrounding each of the all four coefficients is judged by true or false criteria. If this condition is met, a decoding processing in a run-length mode is carried out and the context label will then be 17. If this condition is not met, there exits at least one significant coefficient among the four vertically contiguous coefficient values. Hence, UNIFORM context will be used for the position of a coefficient that first becomes significant, and the context label CX then will be 18. The decoding of any remaining coefficients will be carried out in the same manner as S pass.

As described above, in the coefficient bit modeling processing by the context estimation unit 22, the context label CX of each coefficient in a bit-plane is decided using any one of three processing passes.

A group of peripheral information registers 20 are provided with five types of registers each of which is of 32 bits horizontally and 32 bits vertically corresponding to the size of a bit-plane in a code-block, and they retain peripheral information of the whole code-block. A first register to a five register, which constitute the group of peripheral information registers 20, store information that the context estimation unit 22 requires in order to obtain a context label CX in each processing pass in a bit-plane.

The first register in the group of peripheral information registers 20 stores information indicating whether each coefficient is significant or insignificant. The second register therein stores information indicating whether or not each coefficient became significant in the bit-plane right above, and such information will be used in an R pass processing. The third register therein stores information indicating whether each coefficient became significant in the current bit-plane or not; this information will be needed for generating information in the second register. The fourth register stores information indicating whether each coefficient has already been decoded or not, and such information will be used in a C pass processing. Though information of the fourth register can be computed from that of the first and third registers, it will be retained separately for processing convenience. The fifth register stores information on polarity that indicates the sign (positive/negative) of each coefficient.

The contents of the first and fifth registers are reset to zero when a code-block processing starts or ends. The contents of the second register are initialized by copying the contents of the third register when a bit-plane processing starts or ends. The contents of the third and fourth registers are reset to zero when the bit-plane processing starts or ends.

Figure 11:
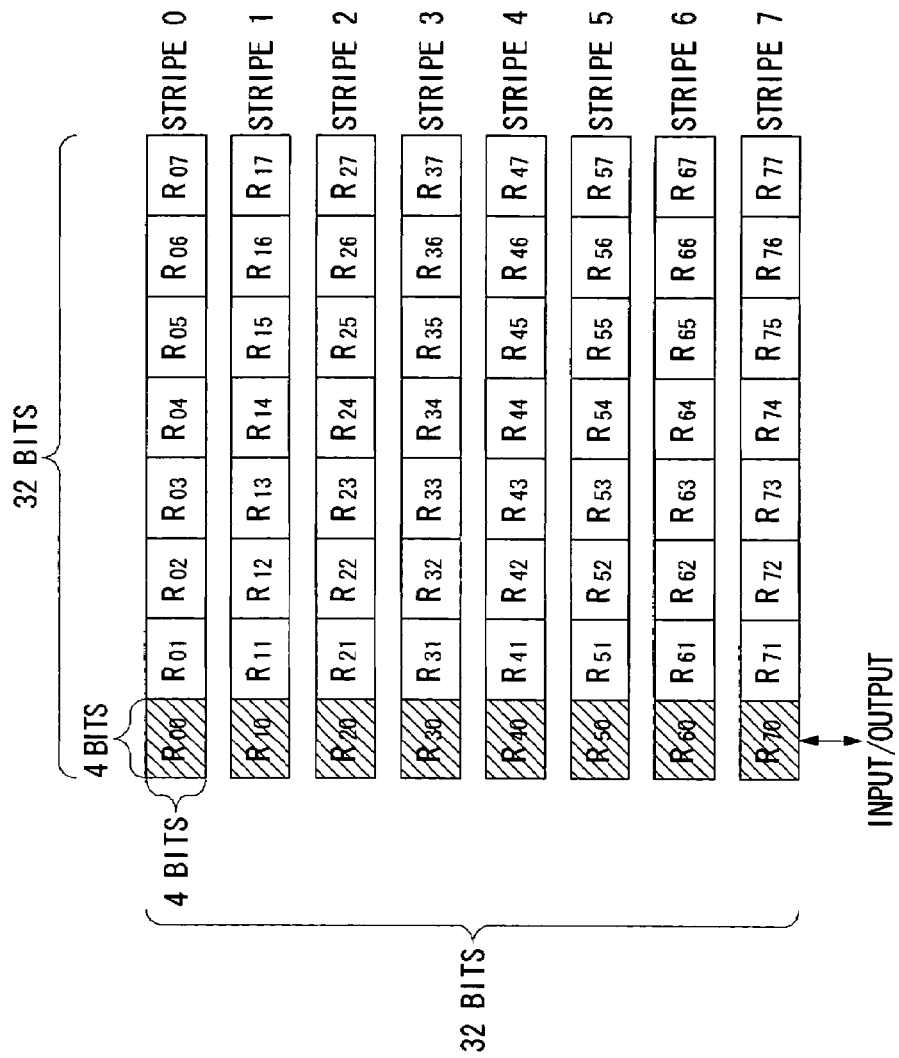
FIG. 11 illustrates structures of the respective registers in a group of peripheral information registers.

FIG. 11 illustrates structures of the respective registers in the group of peripheral information registers 20. Each of five types of registers included in the group of peripheral information registers 20 has a structure such that registers each of which has the size of a stripe are arranged for an appropriate number of stripes according as a code-block is scanned and decoded per stripe. Each register string is of 4 bits vertically corresponding to four pixels of a stripe in the vertical direction and of 32 bits horizontally corresponding to thirty-two pixels in horizontal width of a code-block.

To achieve higher speed and reduced size, each register string is a shift-register such that it is separated every four bits in the horizontal direction like $R_{00}$ to $R_{07}$, $R_{10}$ to $R_{17}$, . . . and $R_{70}$ to $R_{77}$, and the write and read-out are possible to and from the leftmost four bits only, shaded by oblique lines in FIG. 11, which are $R_{00}$, $R_{10}$, . . . and $R_{70}$. Hereinafter, such each set composed of four bits will be called a register block.

Since, in the case of first and fifth registers only, referring to surrounding neighbor coefficients is needed in the S pass processing, one pixel in the left and right of a leftmost register block can be read out. That is, a structure is such that, in addition to four bits of each of the leftmost register blocks $R_{00}$, $R_{10}$, . . . and $R_{70}$, the left-side one bit of each of register blocks $R_{01}$, $R_{11}$, . . . and $R_{71}$ that lie to the right thereof and the right-side one bit of each of register blocks $R_{07}$, $R_{17}$, . . . and $R_{77}$ that lie logically to the left thereof (actually the rightmost register blocks) can be read out together.

Figure 12A:
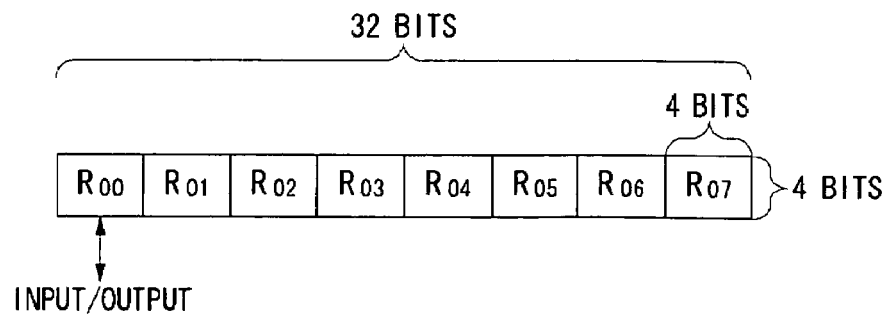
FIGS. 12A and 12B illustrate an operation of each register string shown in FIG. 11.
Figure 12B:
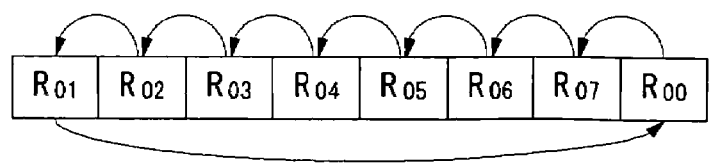

FIGS. 12A and 12B are provided to explain an operation of each register string shown in FIG. 11. FIG. 12A shows, as an example, a register string of the stripe 0 where it is separated every four bits by $R_{00}$ to $R_{07}$ and the write and read are possible to and from only the leftmost four bits $R_{00}$. This register functions as a ring buffer or barrel shifter, and as shown in FIG. 12B the leftmost $R_{00}$ is shifted to the rightmost position and the remaining $R_{01}$ to $R_{07}$ are shifted in sequence to the left by 4 bits, so that the position of a register that the write and read are possible to and from can be each shifted by four bits.

According to the first embodiment, the processing pass is carried out successively in the order of S pass, R pass and C pass on each plane, so that the decoding operation will be as follows. First, C pass processing is performed on each stripe of MSB plane, each stripe is processed until the termination thereof by shifting each register string seven times in four bits and then the register string returns to the beginning after the eighth-time shifting. Next, an S pass processing is performed on each stripe of a plane which is one below the MSB plane. And each stripe is processed until the termination thereof by shifting each register string seven times in four bits and then the register string returns to the beginning after the eighth-time shifting. In this state, an R pass processing is carried out for each stripe of the same plane. And, in the similar manner, each stripe is processed until the termination thereof by shifting each register string seven times in four bits and then the register string returns to the beginning after the eighth-time shifting. Thereafter, a C pass processing is carried out in the similar manner. This will be repeated until the processing reaches the LSB plane, so that the decoding processing of a code-block in question is completed.

In the course of a processing for decoding a code-block, the contents of peripheral information stored in the group of peripheral information registers 20 is updated in the decoding cycle every time the arithmetic decoding unit 24 decodes a coefficient of a bit-plane and makes a decision D.

As described above, according to the first embodiment, the contents of peripheral information necessary for estimating the context of each efficient is stored in the registers, so that the context can be estimated by reading out the peripheral information at high speed and the thus estimated context can be delivered to the arithmetic decoding unit. Moreover, the peripheral information retained in registers in the same cycle as the arithmetic decoding can be updated, utilizing a result of operation by the arithmetic decoding. When the peripheral information is stored in a memory such as an SRAM, addressing will be required. As a result, it takes several cycles in the read-out and write operation and this will slow down the processing. According to the present embodiment, storing the peripheral information in the registers allows a series of processings in the same cycle. Here, the series of processings are the reading out of the peripheral information, the estimation of contexts, the decoding of arithmetic codes and the updating of the peripheral information. That is, the decoding of one pixel can be processed in one cycle, so that the decoding processing will be carried out at high speed.

Second Embodiment

Figure 13:
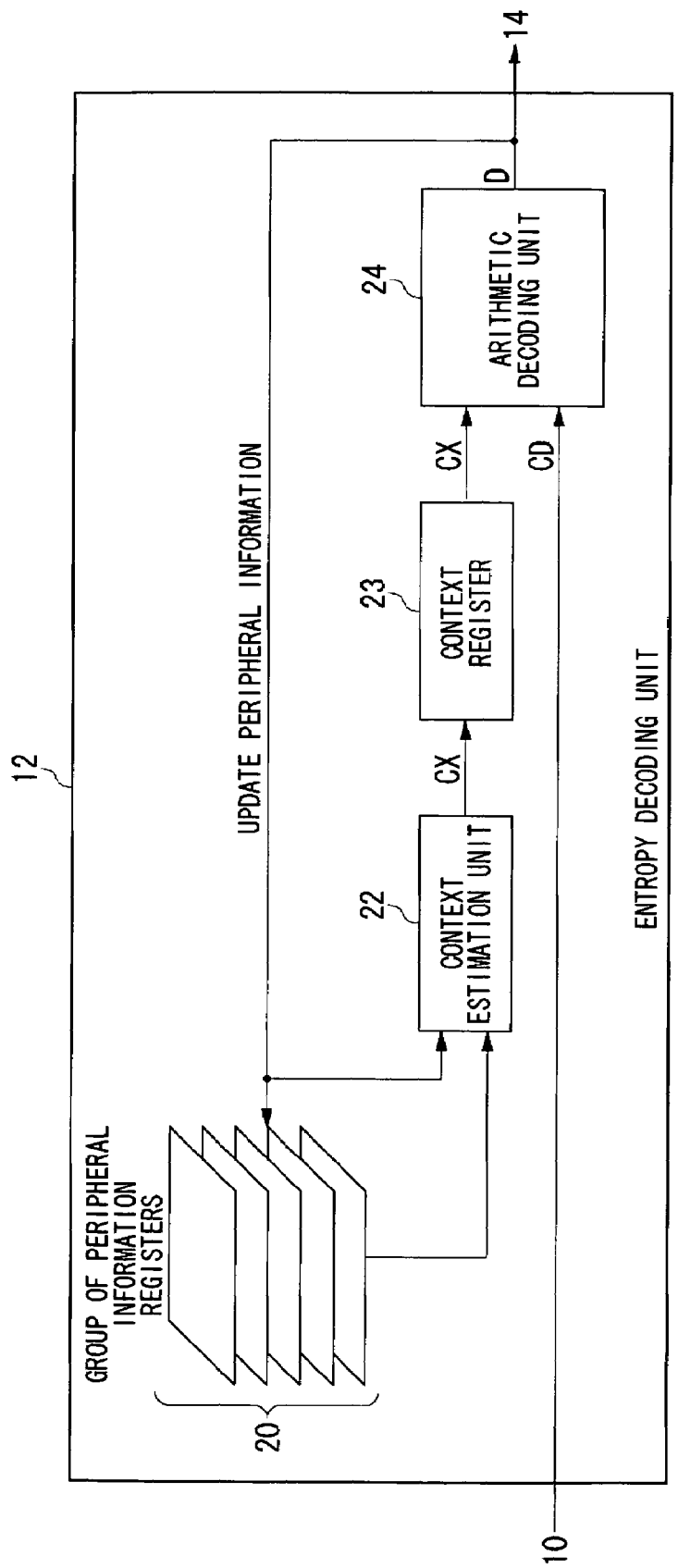
FIG. 13 illustrates a structure of an entropy decoding unit in an image decoding apparatus according to a second embodiment of the present invention.

FIG. 13 illustrates a structure of an entropy decoding unit 12 in an image decoding apparatus according to a second embodiment of the present invention. The image decoding apparatus according to this second embodiment is the same as an image decoding apparatus 100 according to the first embodiment except for the structure of an entropy decoding unit 12.

In an entropy decoding unit 12 according to this second embodiment, a context register 23 for holding a context label CX calculated in advance by a context estimation unit 22 is provided immediately after the context estimation unit 22.

In a group of peripheral information registers 20, the contents to be held by the respective registers are updated as appropriate, receiving the feedback of decision D derived from the decoding of coded data CD by an arithmetic decoding unit 24. The context estimation unit 22 refers to the group of peripheral information registers 20, which is thus updated, in order to estimate the next context. According to the second embodiment, the context estimation unit 22 can further receive the value of decision D directly from the arithmetic decoding unit 24, not through the group of peripheral information registers 20. Through this structure and procedure, the context estimation unit 22 gets a context label CX necessary for the next cycle earlier, and the context register 23 latches the context label CX. The arithmetic decoding unit 24 receives the context label CX latched by the context register 23 and proceeds with the decoding of the coded data CD.

According to this second embodiment, therefore, computation of a context label CX bypassing the group of peripheral information registers 20 is possible in parallel with the normal computation of a context label CX using the group of peripheral information registers 20. Thus, decoding processing can be performed at even higher speed with the arithmetic decoding unit 24 using a latched context label CX.

Third Embodiment

Figure 14:
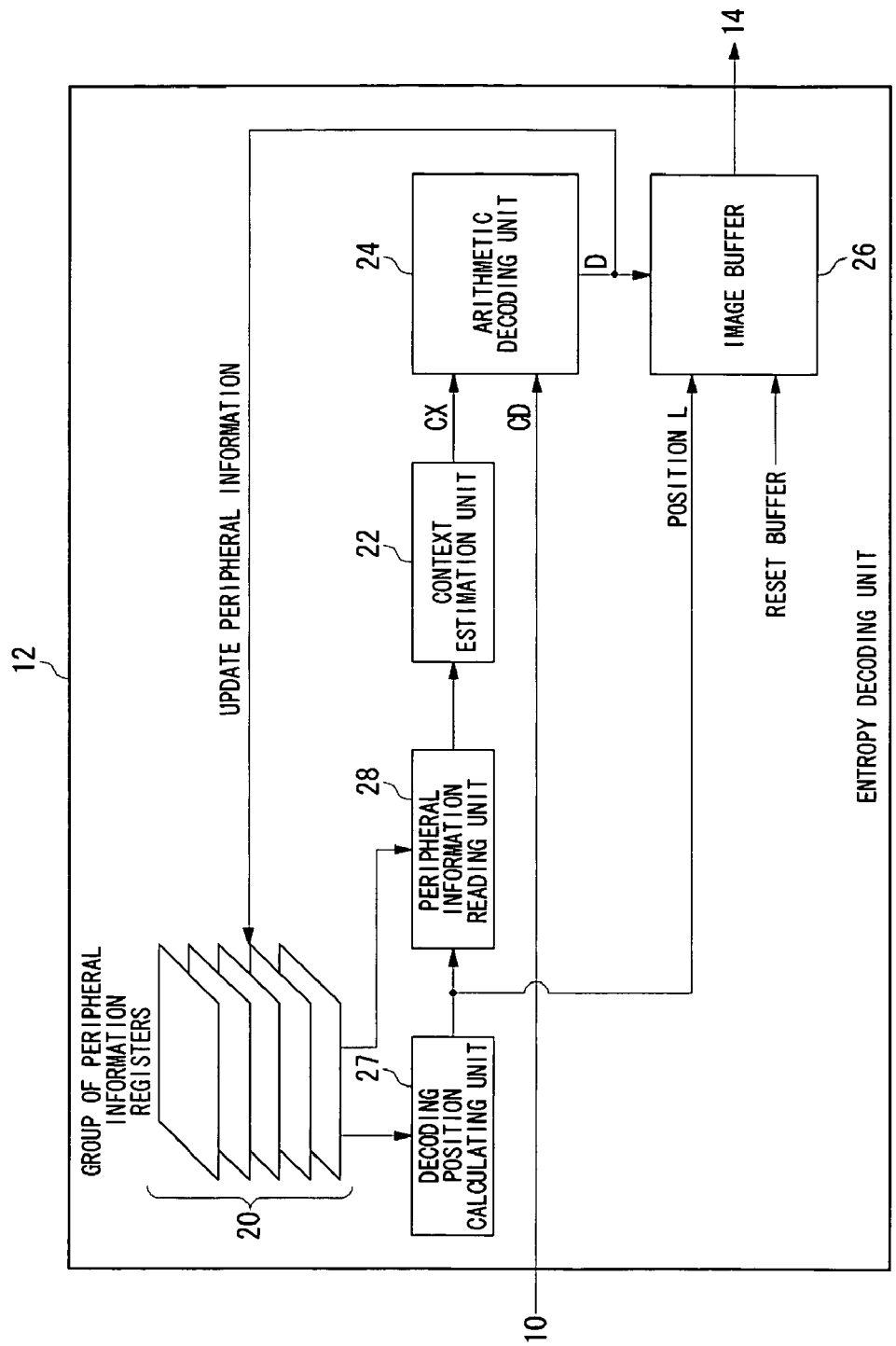
FIG. 14 illustrates a structure of an entropy decoding unit in an image decoding apparatus according to a third embodiment of the present invention.

FIG. 14 illustrates a structure of an entropy decoding unit 12 in an image decoding apparatus according to a third embodiment of the present invention. The image decoding apparatus according to this third embodiment is also the same as an image decoding apparatus 100 according to the first embodiment except for the structure of an entropy decoding unit 12.

The entropy decoding unit 12 according to this third embodiment performs decoding by scanning the stripes of bit-planes. In doing so, however, it does not decode by scanning all the coefficients but decodes only by specifying the positions of coefficients to be decoded.

A decoding position calculating unit 27 calculates the positions of coefficients to be decoded in each processing pass by referring to the peripheral information stored in a group of peripheral information registers 20.

Figure 15A:
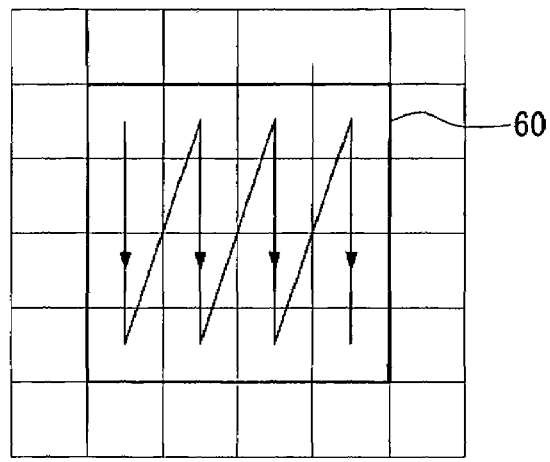
FIGS. 15A to 15C illustrate how decoding positions are calculated by a decoding position calculating unit shown in FIG. 14.
Figure 15B:
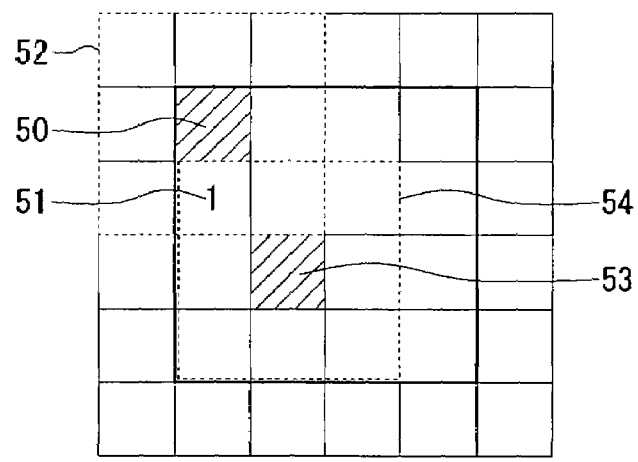
Figure 15C:
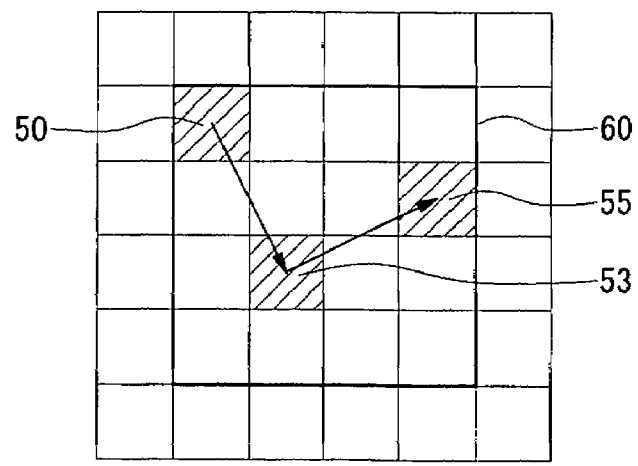

FIGS. 15A to 15C illustrate how decoding positions are calculated by the decoding position calculating unit 27. FIG. 15A shows a sequence of decoding, indicated by arrows, of a minimum processing unit 60 composed of four-by-four pixels, in which four vertical pixels are scanned in each stroke. And, normally, decoding is done by checking on peripheral information pixel by pixel in this scanning order.

In S pass, decoding is performed if there is even one significant coefficient on the periphery of an insignificant coefficient. Since information on the eight surrounding neighbor coefficients of a given coefficient can be partially used as peripheral information on other coefficients, it is possible to specify a next coefficient to be decoded from the peripheral information so far derived without checking on peripheral information on all the pixels. For example, as shown in FIG. 15B, let us suppose that, of the eight surrounding neighbor coefficients 52 within dotted lines for the upper left corner coefficient 50 indicated by oblique lines, a coefficient denoted by reference numeral 51 is significant. Then it is apparent that for a second coefficient 53 indicated by oblique lines, for instance, there is also at least one significant coefficient among its eight surrounding neighbor coefficients 54. And therefore the second coefficient 53 can be determined to be a coefficient to be decoded. FIG. 15C shows how the coefficients 50, 53 and 55, thus chosen and determined for decoding, are decoded in this sequence.

Referring back to FIG. 14, a peripheral-information reading unit 28 reads from the group of peripheral information registers 20 peripheral information for the position determined by a decoding position calculating unit 27 and delivers it to the context estimation unit 22. Decision D made by the arithmetic decoding unit 24 is stored in an image buffer 26 according to position L determined by the decoding position calculating unit 27. Decoded wavelet transform coefficients written out to the image buffer 26 are outputted to an inverse quantization unit 14. Upon completion of a predetermined unit, such as a code-block or a stripe, of decoding, the image buffer 26 is reset before it starts to store the results of the next unit of decoding.

According to the third embodiment, reference made to the information contained in the group of peripheral information registers 20 allows identification of a coefficient to be decoded next in each processing pass, and skipping of processing of coefficients that do not require decoding, so that the decoding can be performed even faster than the previous embodiments.

Fourth Embodiment

Figure 16:
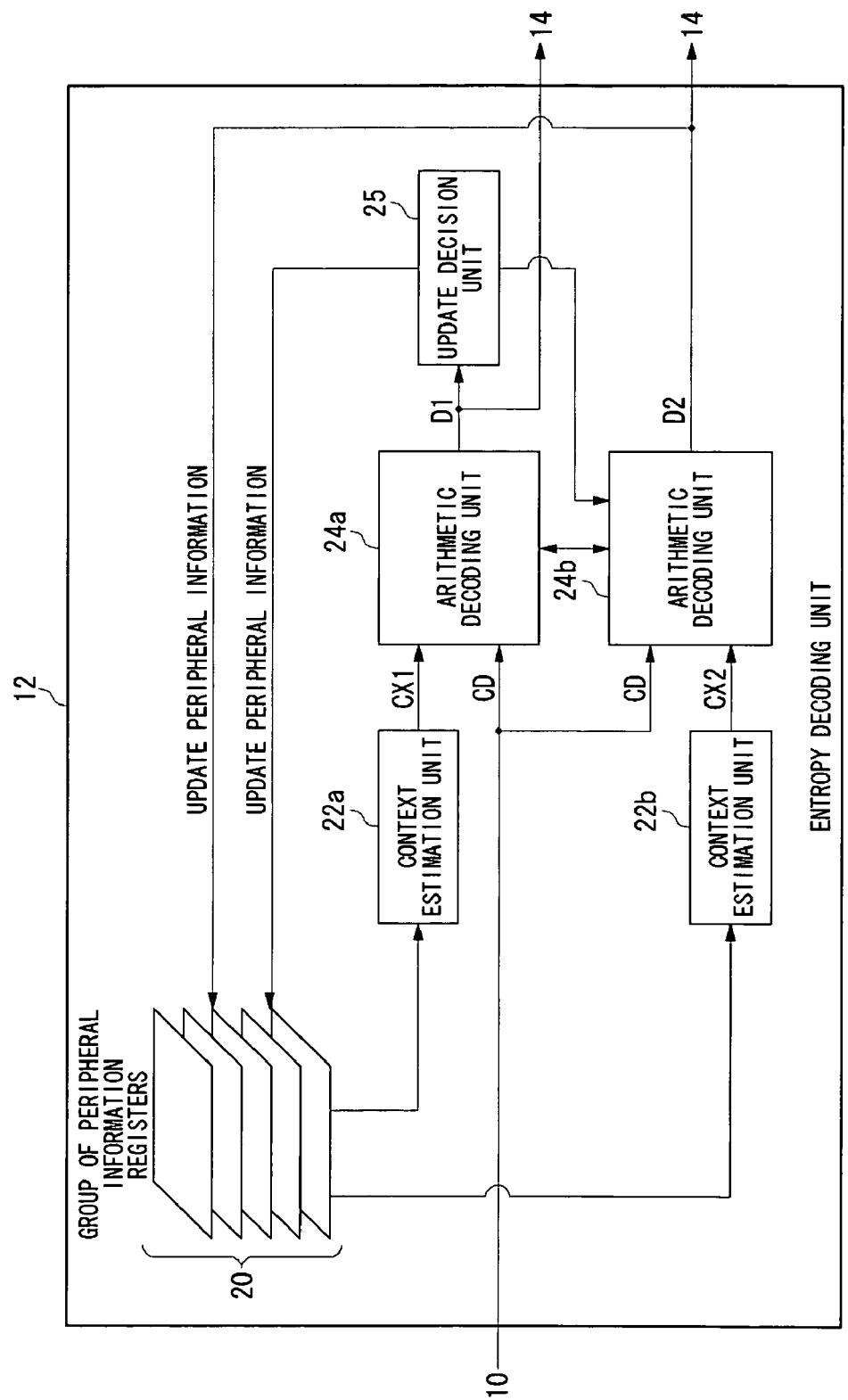
FIG. 16 illustrates a structure of an entropy decoding unit in an image decoding apparatus according to a fourth embodiment of the present invention.

FIG. 16 illustrates a structure of an entropy decoding unit 12 in an image decoding apparatus according to a fourth embodiment of the present invention. The image decoding apparatus according to this fourth embodiment is also the same as an image decoding apparatus 100 according to the first embodiment except for the structure of an entropy decoding unit 12.

According to this fourth embodiment, two context estimation units 22a and 22b and two arithmetic decoding units 24a and 24b are provided, whereby two pixels are decoded in parallel with each other. The first context estimation unit 22a estimates a context label CX1 for a first pixel, and based on the context label CX1, the first arithmetic decoding unit 24a performs a decoding of the first pixel and outputs a first decision D1. On the other hand, the second context estimation unit 22b estimates a context label CX2 for a second pixel, and based on the context label CX2, the second arithmetic decoding unit 24b performs a decoding of the second pixel and outputs a second decision D2.

An update decision unit 25 checks the value of the first decision D1 from the first arithmetic decoding unit 24a and determines whether it is necessary or not to update the information inputted to the second arithmetic decoding unit 24b, using the result of decoding by the first arithmetic decoding unit 24a. If it is necessary, the update decision unit 25 supplies the result of decoding by the first arithmetic decoding unit 24a to the second arithmetic decoding unit 24b. The first and second arithmetic decoding units 24a and 24b exchange probability estimates with each other, thus improving the accuracy of arithmetic decoding.

Both the first and second decisions D1 and D2 made by the first and second arithmetic decoding units 24a and 24b, respectively, are fed back to the group of peripheral information registers 20, whereby the information held in each of the registers is updated.

In this fourth embodiment, a structure may be such that, as with the case of the second embodiment, context registers 23a and 23b are further provided immediately after the first and second context estimation units 22a and 22b, respectively, so that the context labels CX1 and CX2 are latched.

Fifth Embodiment

Figure 17:
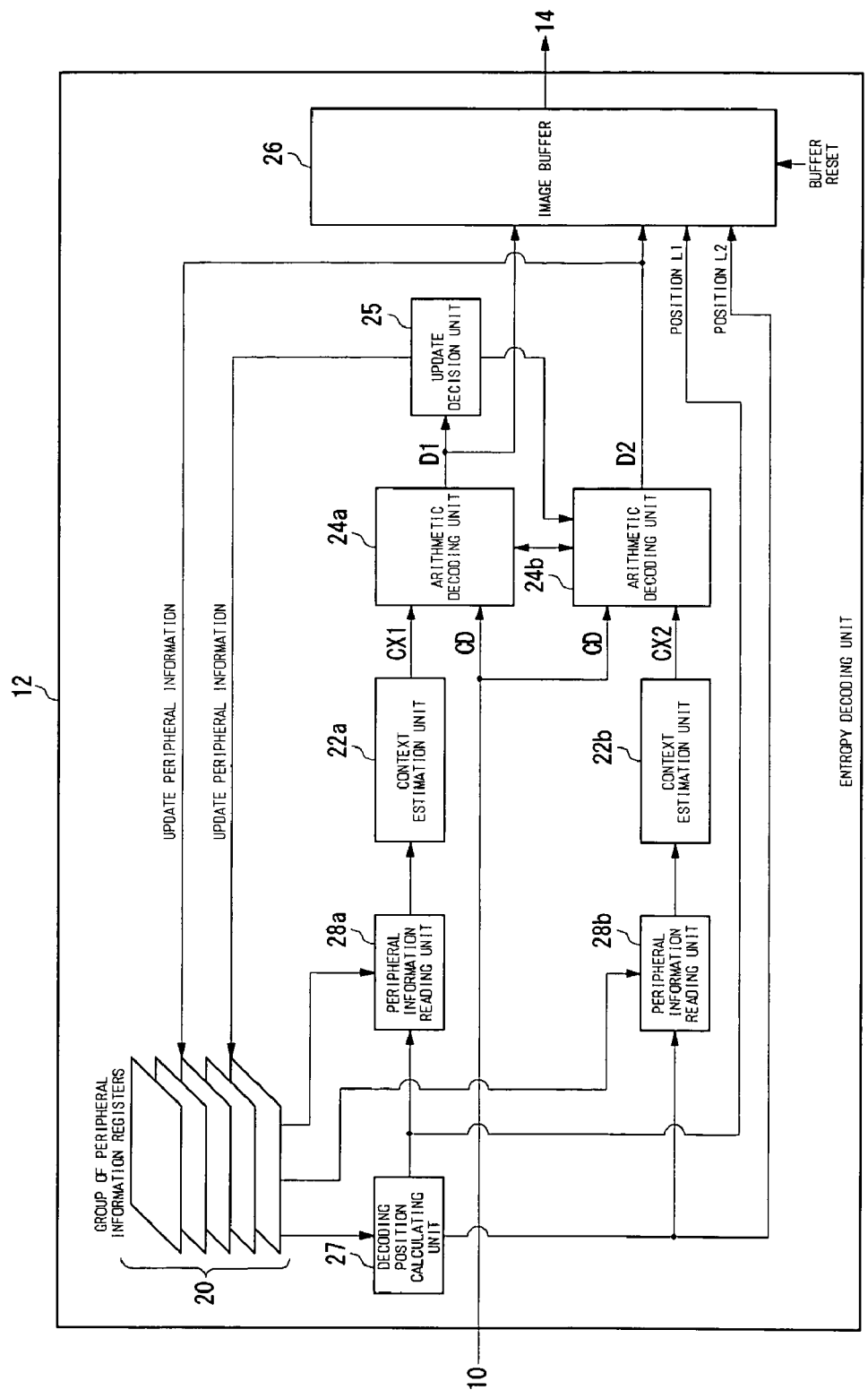
FIG. 17 illustrates a structure of an entropy decoding unit in an image decoding apparatus according to a fifth embodiment of the present invention.

FIG. 17 illustrates a structure of an entropy decoding unit 12 in an image decoding apparatus according to a fifth embodiment of the present invention. The image decoding apparatus according to this fifth embodiment is also the same as an image decoding apparatus 100 according to the first embodiment except for the structure of an entropy decoding unit 12.

This fifth embodiment represents a change in structure of an entropy decoding unit 12 of the third embodiment shown in FIG. 14 in such a way as to enable a parallel decoding of two pixels. In the entropy decoding unit 12, two peripheral-information reading units 28a and 28b, two context estimation units 22a and 22b and two arithmetic decoding units 24a and 24b are provided.

A decoding position calculating unit 27 calculates the positions of coefficients to be decoded in each processing pass by referring to the peripheral information held in a group of peripheral information registers 20 in a manner explained in the third embodiment. According to this fifth embodiment, however, two positions of coefficients to be decoded are derived to effect a parallel processing, and positions L1 and L2 are supplied to the first and second peripheral-information reading units 28a and 28b, respectively. The first and second peripheral-information reading units 28a and 28b read from the group of peripheral information registers 20 peripheral information for the positions L1 and L2 determined by the decoding position calculating unit 27, respectively, and supply the information to the first and second context estimation units 22a and 22b, respectively.

From this point on, the parallel decoding operation for the two pixels of the first and second context estimation units 22a and 22b, the first and second arithmetic decoding units 24a and 24b, and an update decision unit 25 is the same as the operation described in the fourth embodiment.

An image buffer 26 stores first and second decisions D1 and D2 outputted from first and second arithmetic decoding units 24a and 24b, respectively, according to the positions L1 and L2 given by the decoding position calculating unit 27.

In this fifth embodiment, a structure may be such that, as with the case of the second embodiment, context registers 23a and 23b are further provided after the first and second context estimation units 22a and 22b, respectively, so that the context label CX is latched.

Sixth Embodiment

Figure 18:
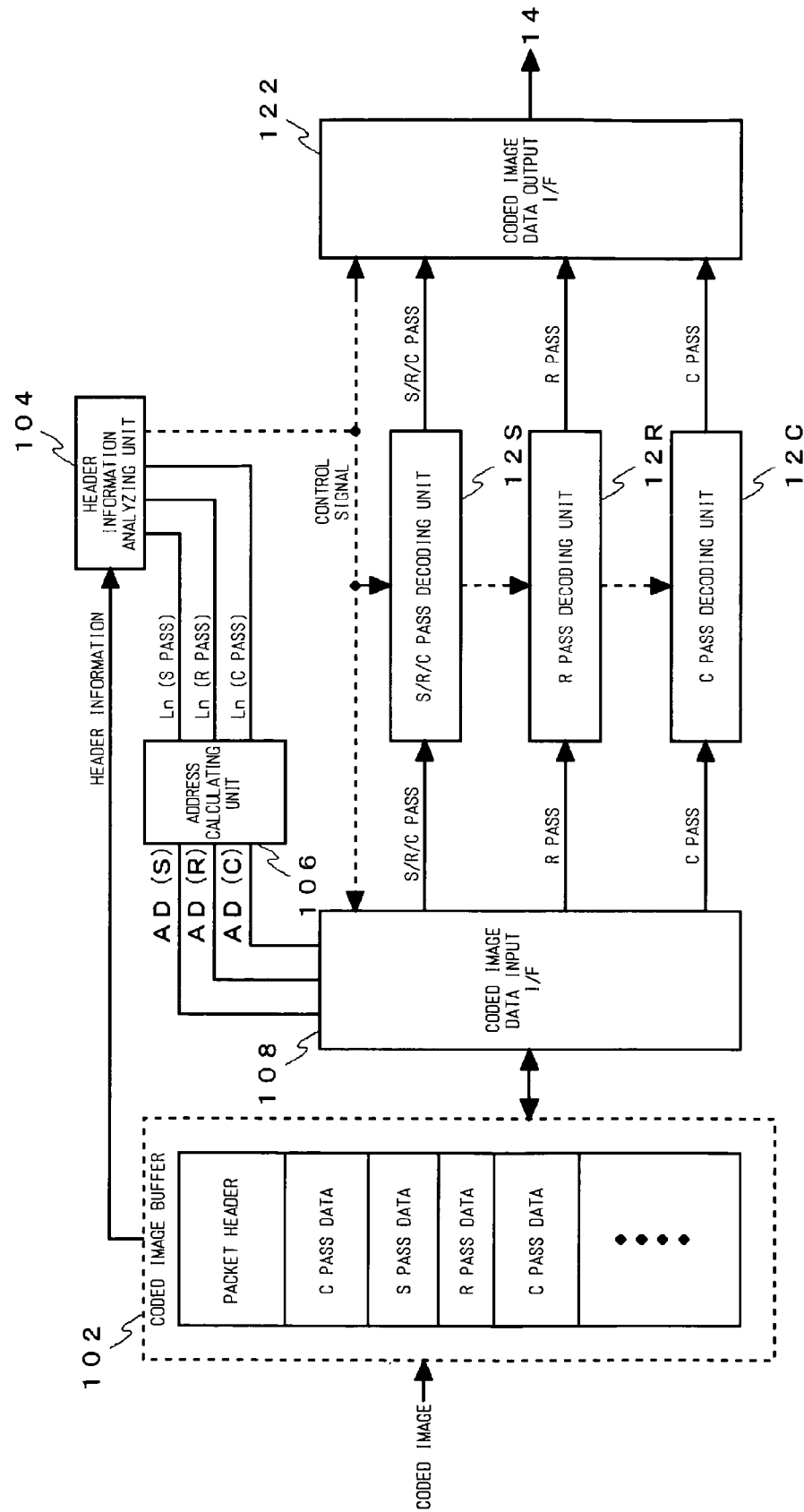
FIG. 18 illustrates a structure of a stream analyzing unit and an entropy decoding unit in an image decoding apparatus according to a sixth embodiment of the present invention.

FIG. 18 illustrates a structure of a stream analyzing unit 10 and an entropy decoding unit 12 in an image decoding apparatus according to a sixth embodiment of the present invention. The image decoding apparatus according to this sixth embodiment is the same as an image decoding apparatus 100 according to the first embodiment except for the structure of the stream analyzing unit 10 and the entropy decoding unit 12.

The entropy decoding unit 12 according to this sixth embodiment realizes parallel processing of the different processing passes. That is, it includes an S/R/C pass decoding unit 12S, an R pass decoding unit 12R and a C pass decoding unit 12C so as to parallelize the processing passes of S pass, R pass and C pass.

The stream analyzing unit 10 includes a coded image buffer 102, a header information analyzing unit 104, an address calculating unit 106 and a coded image data input interface 108. The coded image buffer 102 stores inputted coded image data temporarily. It is formed by an SDRAM or the like. The coded image data of JPEG2000 are inputted in units of packet.

FIGS. 19A and 19B show examples of file structure of JPEG2000. Each file structure has markers assigned to specify the image size, the unit of quantization and so forth. While FIG. 19A shows a structure with PPM (Packed packet headers, main header marker) placed as a marker, FIG. 19B shows s structure without PPM appended. In the case of FIG. 19A, headers of all the packets are described after PPM and then data of all the packets are described. In the case of FIG. 19B, the description following the markers progresses with the header and data of a first packet first, the header and data of a second packet next, and so on. As this description advances, the resolution goes higher. In the header of a packet, at least the number of coding passes and the length of coded image data, which is the length before a code termination processing, can be described.

In the COD (Coding style default) marker, a description is given of whether coding has been done independently for each coding pass or not. In other words, a description is given of whether a context reset at a pass boundary has been made or not when arithmetic coding is performed by an arithmetic coder in an image coding apparatus, that is, whether the indexes and symbols in the arithmetic coder have been initialized or not. In JPEG2000, therefore, a computation method is selectable from one in which data for arithmetic coding are flushed at the end of arithmetic coding for each coding pass and parameters are reset in preparation for the next coding and the other in which data for arithmetic coding in each coding pass are not flushed and the parameters are retained for the next coding.

Also in the COD marker, a description is given of whether a termination processing has been done in each pass or not. With a termination processing done, byte stuffing is performed for each pass, so that the head of codestream of each pass can be found easily. Also, the code byte number of each pass can be written in the header of a packet.

Figure 20:
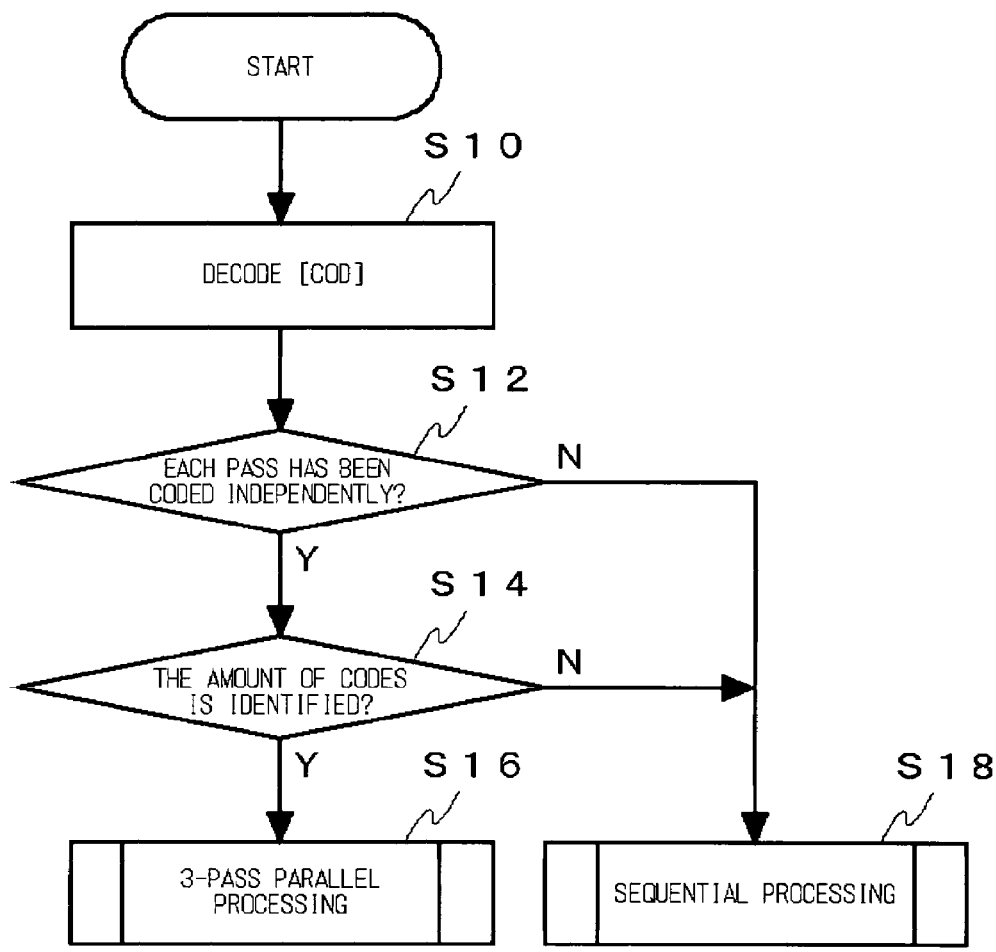
FIG. 20 is a flowchart showing an operation of a header information analyzing unit.

FIG. 20 is a flowchart showing an operation of a header information analyzing unit 104. First the header information analyzing unit 104 reads out and decodes the COD marker of coded image data temporarily stored in a coded image buffer 102 (S10). Then it determines whether the COD marker indicates independence of each coding pass or not (S12). When each coding pass has not been coded independently (N of S12), the coding passes cannot be processed in parallel and thus a sequential decoding processing is selected (S18).

When each coding pass has been coded independently (Y of S12), a termination processing has been done for each coding pass and hence a decision is made as to whether it is possible to identify the amount of codes in the codestream of each coding pass (S14). When it is not possible to identify the amount of codes in the codestream of each coding pass (N of S14), the head of codestream of the second coding pass and thereafter cannot be accessed, so that a sequential decoding processing is selected (S18). When it is possible to identify the amount of codes in the codestream of each coding pass (Y of S14), the head of codestream of the second coding pass and thereafter can be accessed, so that a three-pass parallel decoding processing is selected (S16).

Referring back to FIG. 18, the header information analyzing unit 104, upon selecting a three-pass parallel decoding processing as a result of decoding the COD marker, decodes the packet headers and acquires the head addresses of the packet data and the code amount of codestream of each coding pass. And the header information analyzing unit 104 supplies the head addresses of packet data and the code amount of codestream of each coding pass, namely, the code amount Ln of codestream of S pass, the code amount Ln of codestream of R pass and the code amount Ln of codestream of C pass, to the address calculating unit 106 bit-plane by bit-plane. At the same time, the header information analyzing unit 104 sends a control signal indicating the choice of a three-pass parallel decoding processing mode to the coded image data input interface 108, the S/R/C pass decoding unit 12S, the R pass decoding unit 12R, the C pass decoding unit 12C and the coded image data output interface 122.

The address calculating unit 106 first specifies the head address AD (C0), within the coded image buffer 102, of codestream of C0 pass because there is only C pass over the first bit-plane. This address is a head address of packet data which have been supplied from the header information analyzing unit 104. Then, the head address AD (S1) of codestream of S1 pass is an address which is equal to the head address AD (C0) of codestream of C0 pass plus the code amount Ln of codestream of this C0 pass. This code amount Ln is one which has been supplied from the header information analyzing unit 104. Next, the head address AD (R1) of codestream of R1 pass is an address which is equal to the head address AD (S1) of codestream of S1 pass plus the code amount Ln of codestream of this S1 pass. In this manner, the head address of codestream of each coding pass can be calculated by adding the code amount Ln of codestream of the preceding coding pass to the head address of codestream of the same coding pass.

The coded image data input interface 108 takes out codestreams of the respective coding passes from the coded image buffer 102 based on the head addresses of codestreams of the respective coding passes specified by the address calculating unit 106 and outputs them correspondingly to the S/R/C pass decoding unit 12S, the R pass decoding unit 12R and the C pass decoding unit 12C. The S/R/C pass decoding unit 12S decodes the S pass exclusively, whereas, in parallel with it, the R pass decoding unit 12R decodes the R pass exclusively and the C pass decoding unit 12C decodes the C pass exclusively. In this manner, the decoding in the respective passes is processed in parallel with one another. The coded image data output interface 122 combines the values of decision D outputted respectively from the S/R/C pass decoding unit 12S, the R pass decoding unit 12R and the C pass decoding unit 12C and outputs the value to the inverse quantization unit 14.

Next, the header information analyzing unit 104, if it has selected a sequential decoding as a result of decoding the COD marker, acquires the head address of packet data and supplies it to the address calculating unit 106. At the same time, the header information analyzing unit 104 sends a control signal indicating the choice of the sequential decoding mode to the coded image data input interface 108, the S/R/C pass decoding unit 12S, the R pass decoding unit 12R, the C pass decoding unit 12C and the coded image data output interface 122. Upon receipt of this control signal, the R pass decoding unit 12R and the C pass decoding unit 12C stop their operation, thus saving some electric power.

The address calculating unit 106 specifies the head address of acquired packet data and supplies it to the coded image data input interface 108. The coded image data input interface 108 takes out a codestream of a first coding pass from the coded image buffer 102, based on the head address of the packet data specified by the address calculating unit 106, and outputs the codestreams of S pass, R pass and C pass sequentially to the S/R/C pass decoding unit 12S. The S/R/C pass decoding unit 12S decodes the respective passes sequentially as they are inputted. The coded image data output interface 122 outputs the decision D outputted from the S/R/C pass decoding unit 12S to the inverse quantization unit 14.

FIGS. 21A and 21B are timing charts showing the decoding timing of the codestreams of the respective passes. FIG. 21A shows a decoding timing of a sequential decoding mode. The S/R/C pass decoding unit 12S first decodes the codestream of C0 pass of the first bit-plane and then decodes the codestreams of the bit-planes below in the order of S pass, R pass and C pass.

FIG. 21B shows decoding timings of a three-pass parallel decoding processing mode. First the C pass decoding unit 12C decodes the codestream of C pass of the first bit-plane. Then the S/R/C pass decoding unit 12S, the R pass decoding unit 12R and the C pass decoding unit 12C decode the codestreams of S pass, R pass and C pass, respectively, of the bit-planes below in parallel with one another. In the case of FIG. 21B, which represents that of seven bit-planes, a decoding of a single code block is completed by the decoding of the codestream of C pass of the 7th bit-plane and thereupon a decoding of the bit-planes of a next code block is started. It is therefore apparent from FIGS. 21A and 21B that the three-pass parallel decoding processing mode can realize a decoding processing faster than the sequential decoding mode.

Figure 22:
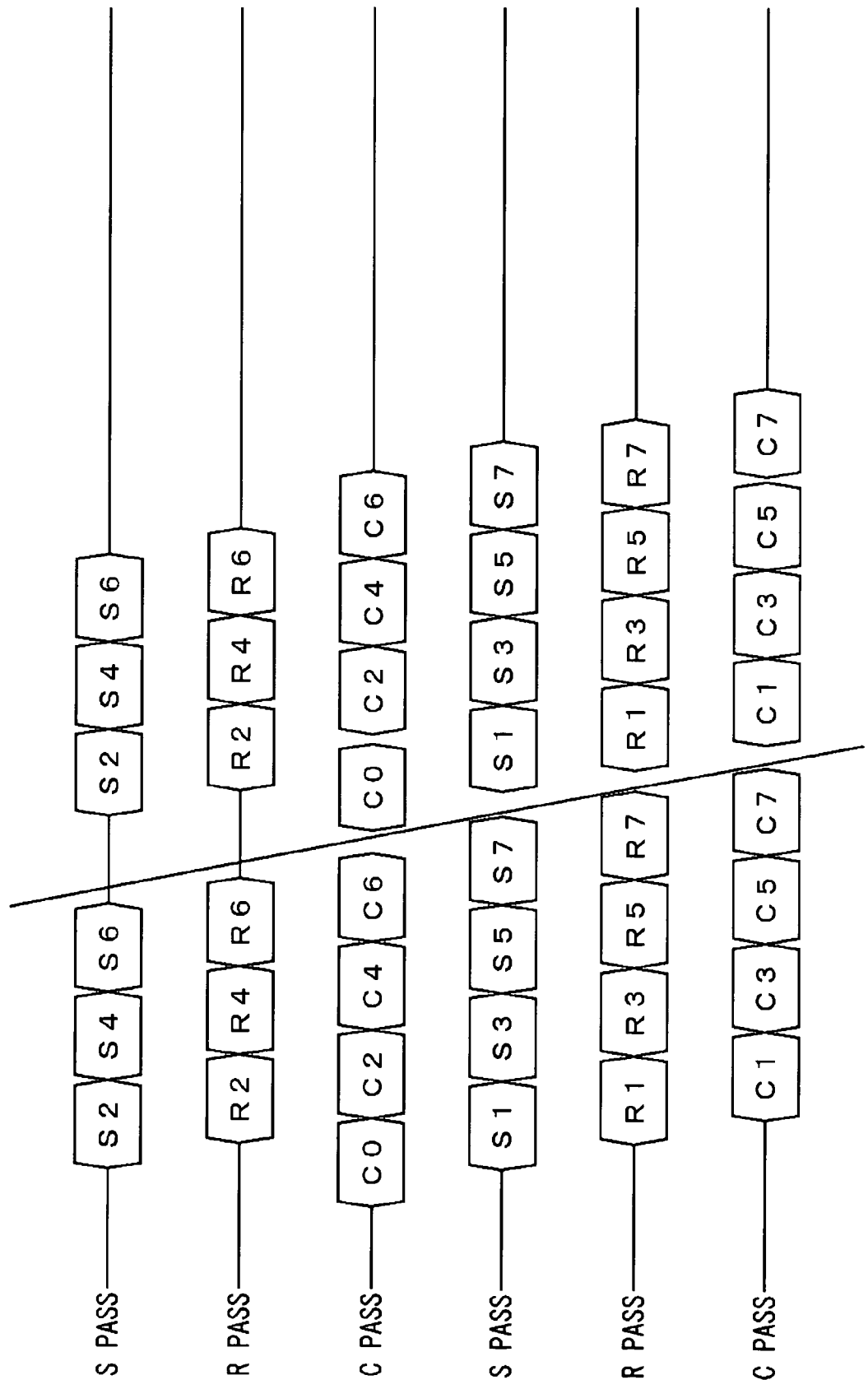
FIG. 22 is a timing chart showing the decoding timing of codestreams of the respective passes when an image decoding apparatus is so structured as to enable a parallel decoding of two bit-planes as described in the fifth embodiment.

FIG. 22 is a timing chart showing the decoding timing of codestreams of the respective passes when an image decoding apparatus is so structured as to enable a parallel decoding of two bit-planes as described in the fifth embodiment. In this structure, two each of the S/R/C pass decoding unit 12S, the R pass decoding unit 12R and the C pass decoding unit 12C as shown in FIG. 18 are provided. The coded image data input interface 108 supplies the codestreams of corresponding passes to each set of the S/R/C pass decoding unit 12S, the R pass decoding unit 12R and the C pass decoding unit 12C at intervals of every other bit-plane. The details of this structure will be described later.

In FIG. 22, one set of the S/R/C pass decoding unit 12S, the R pass decoding unit 12R and the C pass decoding unit 12C decodes the upper three codestreams of an S, R, C pass, and the other set of the S/R/C pass decoding unit 12S, the R pass decoding unit 12R and the C pass decoding unit 12C decodes the lower three codestreams of an S, R, C pass. From FIG. 21B and FIG. 22, it is clear that even in the same three-pass parallel decoding processing mode, use of two sets of the S/R/C pass decoding unit 12S, the R pass decoding unit 12R and the C pass decoding unit 12C realizes a faster decoding.

As described above, according to the sixth embodiment, in the decoding of coded image streams, whose coding has been done independently for the respective passes, the image decoding apparatus can perform a faster decoding with the decoding units 12S, 12R and 12C for their respective passes decoding in parallel with one another. Moreover, with the addition of an S/R/C pass decoding unit 12S, which can decode the codestreams of all the three different passes, the image decoding apparatus can also handle coded image streams whose coding has not been done independently for the three different passes. This feature and structure can further increase the versatility of this image decoding apparatus.

Seventh Embodiment

Figure 23:
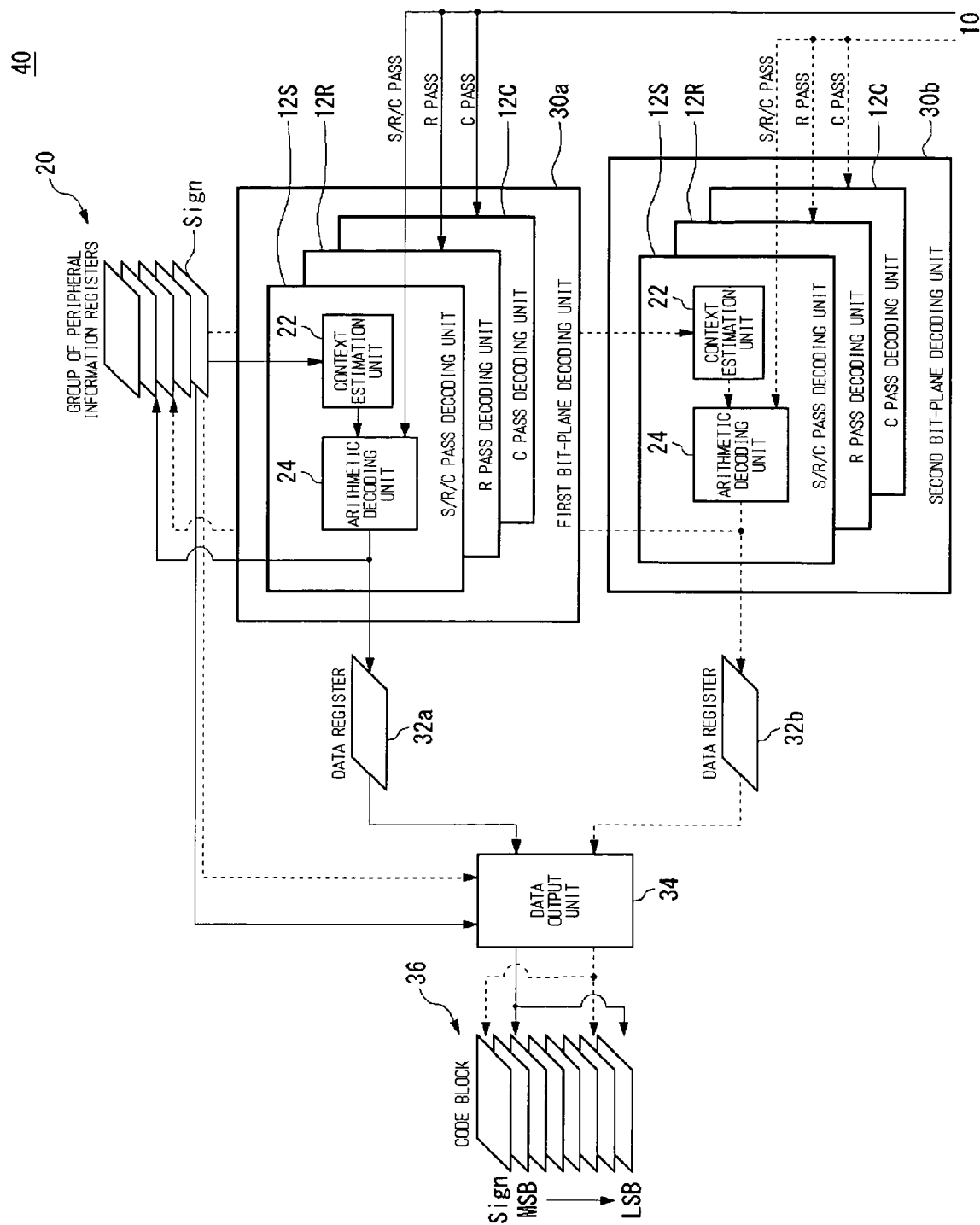
FIG. 23 illustrates a structure of an entropy decoding unit in an image decoding apparatus according to a seventh embodiment of the present invention.

FIG. 23 illustrates a structure of an entropy decoding unit 40 in an image decoding apparatus according to a seventh embodiment of the present invention. The image decoding apparatus according to this seventh embodiment is the same as an image decoding apparatus 100 according to the first embodiment except for the structure of the entropy decoding unit 40 as shown in FIG. 23, which replaces that of the entropy decoding unit 12.

The entropy decoding unit 40 according to this seventh embodiment realizes parallel processing of different bit-planes as well as of different processing passes. For the parallel processing of bit-planes, it is provided with a first bit-plane decoding unit 30a and a second bit-plane decoding unit 30b. Also, for the parallel processing of the processing passes of S pass, R pass and C pass, an S/R/C pass decoding unit 12S, an R pass decoding unit 12R and a C pass decoding unit 12C are included in each of the first bit-plane decoding unit 30a and the second bit-plane decoding unit 30b.

When an inputted coded image takes a format of the byte number of codestream of each pass specified in the header, a parallel processing of the different passes can be accomplished with a stream analyzing unit 10 extracting a codestream for each of the passes. In this case, the codestreams of S pass, R pass and C pass are supplied from the stream analyzing unit 10 to the S/R/C pass decoding unit 12S, the R pass decoding unit 12R and the C pass decoding unit 12C, respectively, for decoding. The S/R/C pass decoding unit 12S decodes the S pass exclusively, whereas, in parallel with it, the R pass decoding unit 12R decodes the R pass exclusively and the C pass decoding unit 12C decodes the C pass exclusively. In this manner, the decoding in the respective passes is processed in parallel with one another.

When the byte number of codestreams of each pass is not specified in the header of a coded image, there are no breaks distinguishable between the passes, thus making it impossible to process the different passes in parallel with one another. When a parallel processing of the different passes cannot be performed, the stream analyzing unit 10 supplies the codestreams of S pass, R pass and C pass sequentially to the S/R/C pass decoding unit 12S. The S/R/C pass decoding unit 12S decodes the respective passes sequentially in the order of S pass, R pass and C pass. At this time, the R pass decoding unit 12R and the C pass decoding unit 12C do not operate. The details of this operation have already been described in the sixth embodiment.

These decoding units 12S, 12R and 12C for the three different passes may be of the structure of any of the entropy decoding units 12 according to the first to fifth embodiments. However, for the simplicity of explanation, the following description represents a case where a plurality of the entropy decoding units 12 according to the first embodiment are used.

The decoding units 12S, 12R and 12C for their respective passes in the first bit-plane decoding unit 30a each include a context estimation unit 22 and an arithmetic decoding unit 24. The context estimation unit 22 reads out peripheral information from a group of peripheral information registers 20, calculates a context label and supplies it to the arithmetic decoding unit 24. The arithmetic decoding unit 24 decodes the coded data of each pass based on the context label and writes the result to a first data register 32a.

The operation is performed the same way at the second bit-plane decoding unit 30b as well. Using the same group of peripheral information registers 20, the second bit-plane decoding unit 30b performs a parallel decoding of the different passes of the second bit-plane and outputs the results to a second data register 32b. In FIG. 23, data flow for the first bit-plane decoding unit 30a is indicated by solid lines whereas data flow for the second bit-plane decoding unit 30b are indicated by dotted lines.

Of the five kinds of registers in the group of peripheral information registers 20, the fifth register is a Sign plane which shows the positive and negative signs of coefficients in a code block. A data output unit 34 reads the results of decoding of the first bit-plane by the first bit-plane decoding unit 30a from the first data register 32a, reads the results of decoding of the second bit-plane by the second bit-plane decoding unit 30b from the second data register 32b, also reads polarity data showing the positive and negative signs of coefficients from the Sign plane in the group of peripheral information registers 20, and finally outputs the results of decoding in the form of a decoded code block 36 which is composed of a Sign plane and planes from MSB to LSB.

According to the seventh embodiment, the group of peripheral information registers 20 is shared by two bit-planes and further shared by the different processing passes within each bit-plane. Accordingly, the structure of the group of peripheral information registers 20 differs partially from that according to the first to fifth embodiments. Hereinbelow, the structure of the group of peripheral information registers 20 and the parallel operation will be described in detail.

Figure 24:
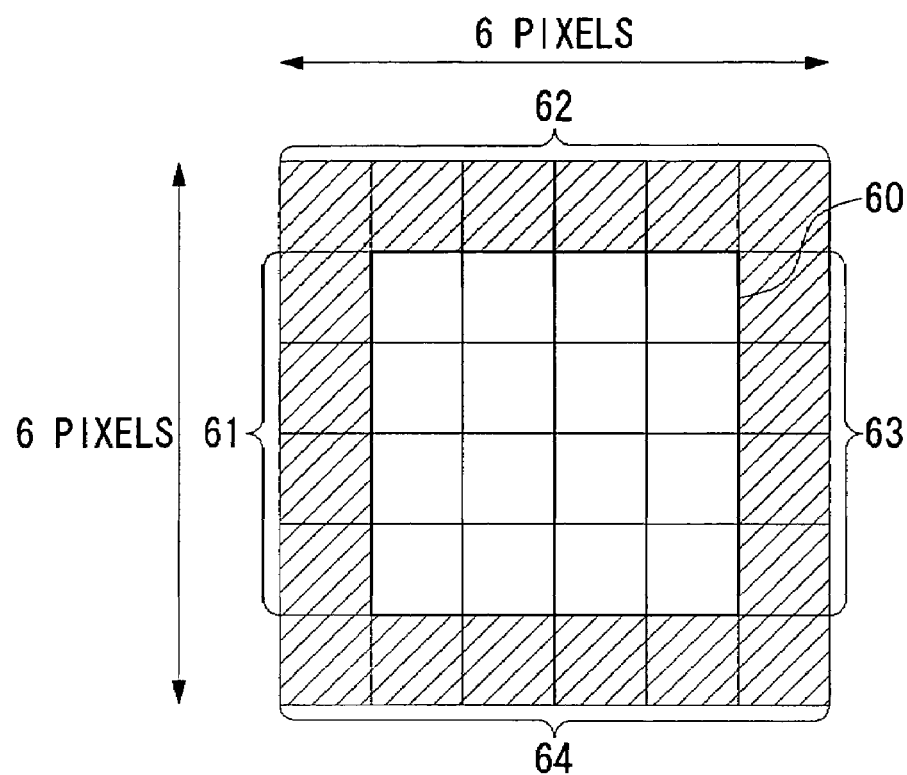
FIG. 24 illustrates a minimum processing unit in each stripe of a bit-plane and a surrounding group of neighboring pixels.

FIG. 24 illustrates a minimum processing unit 60, which is composed of four-by-four pixels, or a total of 16 pixels, in each stripe of a bit-plane and a surrounding group of neighboring pixels. This minimum processing unit 60 is a unit for reading peripheral information from each register of the group of peripheral information registers 20 and is equivalent to a register block in each register string. As already explained in the first embodiment, S pass requires information about the significance state of the eight surrounding neighbor coefficients relative to a coefficient to be processed. Therefore, coding, which is done pixel by pixel in the region of four-by-four pixels, requires peripheral information about the neighboring pixels shaded by oblique lines.

Neighboring pixel groups 62 and 64, which are the upper and the lower six pixels, respectively, are not in the stripe in question but reside in the upper and the lower stripes, respectively. And neighboring pixel groups 61 and 63, which are the left-hand and the right-hand four pixels, respectively, reside in the adjacent register blocks, respectively, in the same stripe.

Figure 25:
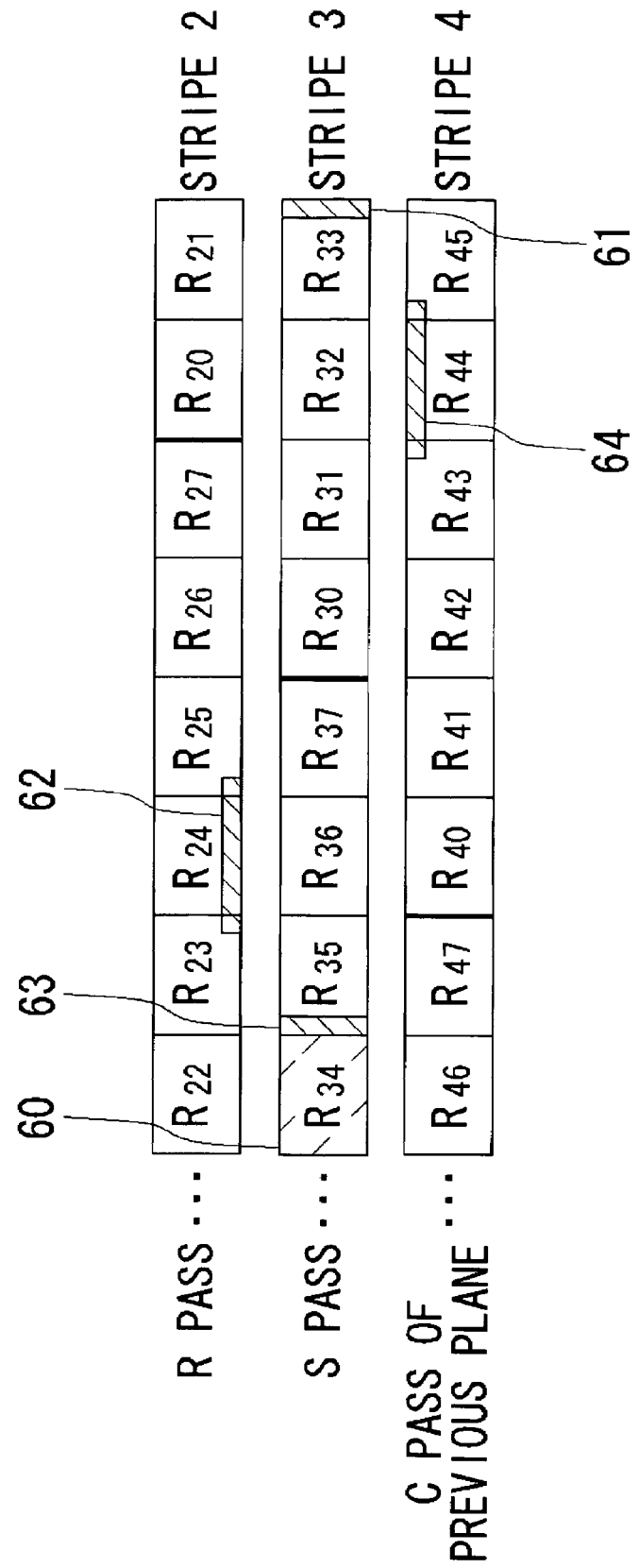
FIG. 25 illustrates corresponding positions on registers of the neighboring pixel groups that surround the minimum processing unit shown in FIG. 24.

FIG. 25 is an illustration for explaining the corresponding positions on the registers of the neighboring pixel groups 61 to 64 that surround the minimum processing unit 60 shown in FIG. 24. Suppose that, at a certain point of time, stripe 2 is subject to an R pass processing, stripe 3 is subject to an S pass processing, and stripe 4 is subject to a C pass processing of the previous bit-plane.

In the R pass, stripe 2 is now being decoded by reading peripheral information from register block $R_{22}$, which is located at the left end. In the S pass, stripe 3 is now being decoded by reading peripheral information from register block $R_{34}$, which is located at the left end. In the C pass, stripe 4 is now being decoded by reading peripheral information from register block $R_{46}$, which is located at the left end. Accordingly, in a parallel processing of the three different processing passes, the decoding positions of the respective processing passes are so controlled as to be dislocated from each other by at least two blocks horizontally in order to avoid the effect of updating of peripheral information.

Let us now direct our attention to the register block $R_{34}$, which is being referred to by the S pass in the decoding of stripe 3. Then the minimum processing unit 60 is positioned at this register block $R_{34}$. On the other hand, the neighboring pixel groups 62 and 64, which are the upper and the lower six pixels, respectively, are positioned at register block $R_{24}$ of stripe 2 and register block $R_{44}$ of stripe 4, respectively. And the neighboring pixel groups 61 and 63, which are the left-hand and the right-hand four pixels, respectively, are positioned at register blocks $R_{33}$ and $R_{35}$, respectively, of stripe 3. For an S pass processing, peripheral information about these neighboring pixel groups 61 to 64 must be read from the register blocks in their respective positions.

Figure 26:
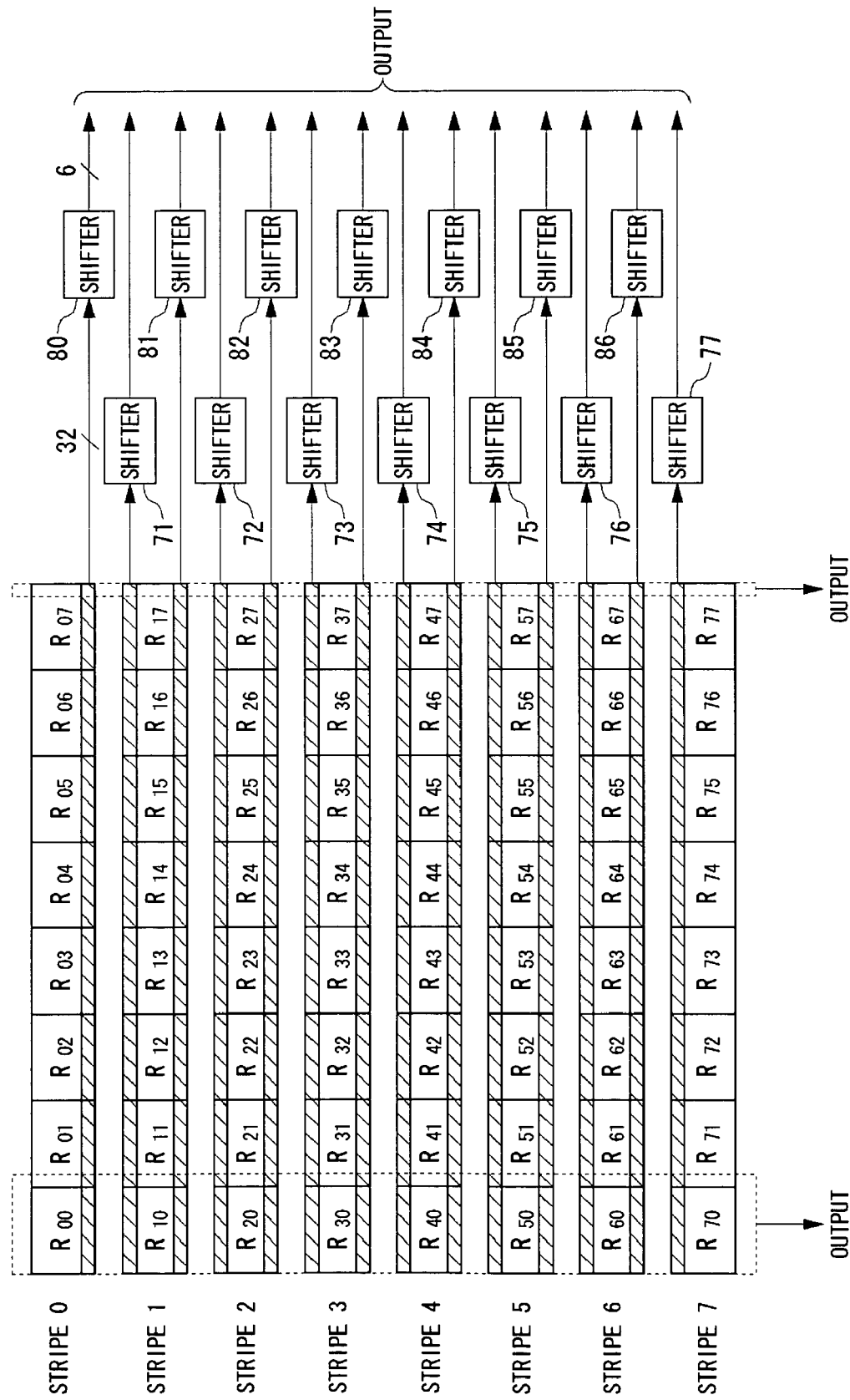
FIG. 26 illustrates a structure of a first register and a fifth register of a group of peripheral information registers.

FIG. 26 is an illustration for explaining a structure of a first register and a fifth register of a group of peripheral information registers 20. In a similar manner to the registers of a group of peripheral information registers 20 according to the first embodiment, register strings are arranged in correspondence to the stripes of a bit-plane, and each register string can be read and written from the left end by shifting four bits at a time onto a ring as with a ring buffer. According to this seventh embodiment, solely with the first register and the fifth register, a total of 6 bits, namely, the 4 bits each of the leftmost register blocks $R_{00}$, $R_{10}$, ... and $R_{70}$, the left-side 1 bit each of the neighboring register blocks on the right $R_{01}$, $R_{11}$, ... and $R_{71}$, and the right-side 1 bit each of the neighboring register blocks logically on the left (actually at the rightmost) $R_{07}$, $R_{17}$, ... and $R_{77}$, are outputted.

Further, solely with the first register and the fifth register, the upper-end 1 bit string running across all the register blocks within each of the register strings corresponding to stripes 1 to 7 is inputted to and held in shifters 71 to 77, respectively. The lower-end 1 bit string running across all the register blocks within each of the register strings corresponding to stripes 0 to 6 is inputted to and held in shifters 80 to 86, respectively. Each of the shifters 71 to 77 and 80 to 86 receives an input of 32 bits and makes an output of 6 bits. With an amount of shift instructed, it will output six each of the upper and lower neighboring pixels as explained in FIG. 25. For the first register and the fifth register, therefore, a total of fourteen shifters 71 to 77 and 80 to 86 are provided to perform the reading of the upper and lower neighboring pixels.

The second, the third and the fourth register in the group of peripheral information registers 20 may be of the same structure as the register according to the first embodiment because they do not require the reading of information on the neighboring pixels. It is to be also noted here that in the first embodiment, a parallel processing of passes is not done and thus there is no need for shifting the pass processing in each stripe. According to the first embodiment, therefore, the sifter arrangement is not required by the first and the fifth register, either.

Referring back to FIG. 25, a description will be presented of how the amount of shift is given to the shifters in order to take out the upper and lower neighboring pixels thereby. The amount of shift for taking out the lower neighboring pixel 64 may be obtained by subtracting 4, which is the horizontal position of register block $R_{34}$ now being referred to in S pass, from 6, which is the horizontal position of register block $R_{46}$ now being referred to in C pass. That is, the amount of shift is 2. The context estimation unit 22 gives the shift amount of 2 to the upper shifter 74 of the register string corresponding to stripe 4 shown in FIG. 21, thereby shifting the 32 bits of information held by the shifter two blocks to the right. Thus the peripheral information on this neighboring pixel 64 can be taken out.

In a similar manner, the amount of shift for taking out the upper neighboring pixel 62 may be obtained by subtracting 4, which is the horizontal position of register block $R_{34}$ now being referred to in S pass, from 2, which is the horizontal position of register block $R_{22}$ now being referred to in R pass. That is, the amount of shift is −2. The context estimation unit 22 gives the shift amount of −2 to the lower shifter 82 of stripe 2 shown in FIG. 26, thereby shifting the 32 bits of information held by the shifter two blocks to the left. Thus the peripheral information on this neighboring pixel 62 can be taken out.

Figure 27:
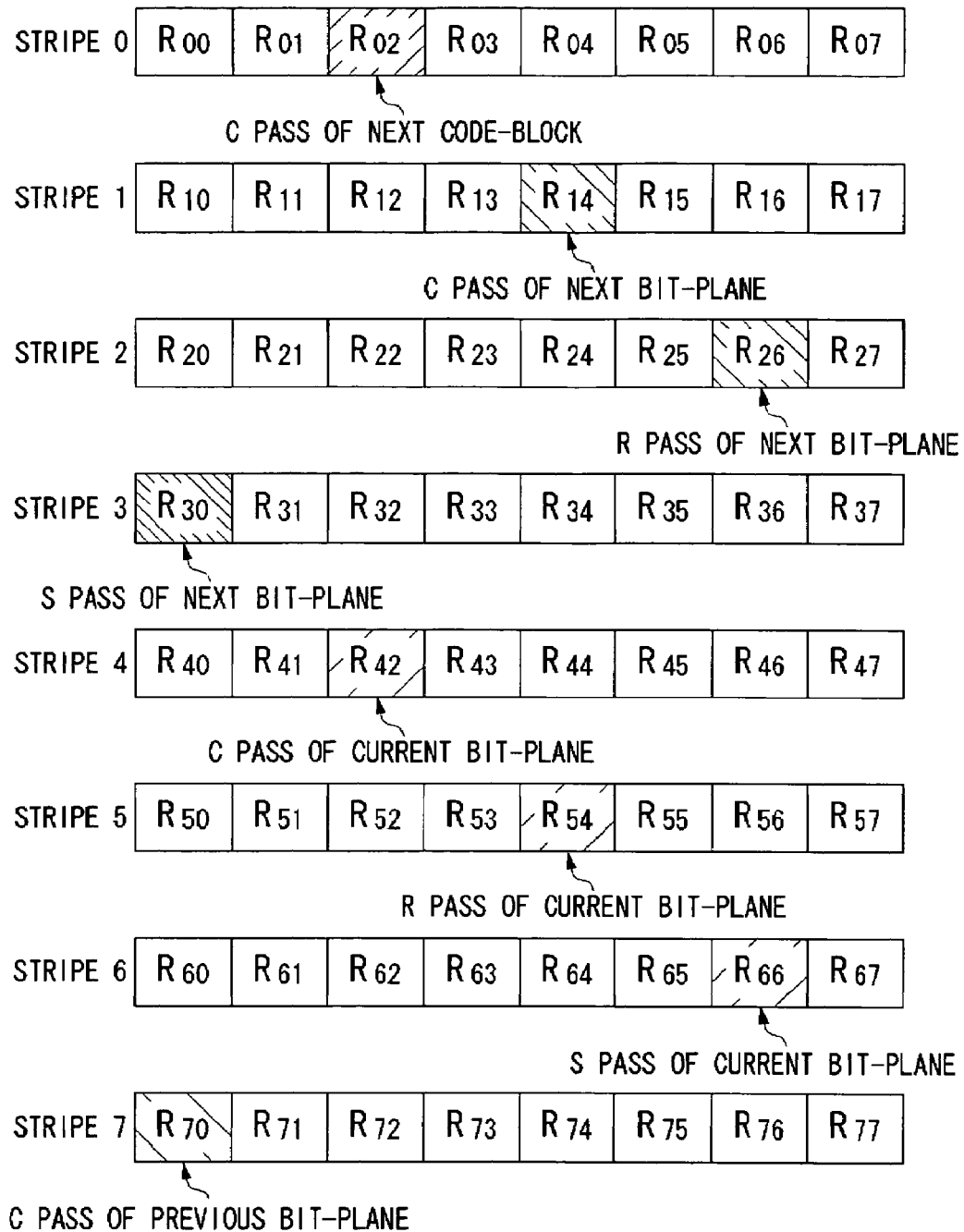
FIG. 27 illustrates how a parallel processing of bit-planes and passes is performed by sharing a group of peripheral information registers.

FIG. 27 is an illustration for explaining how a parallel processing of bit-planes and passes is performed by sharing a group of peripheral information registers 20. Shown in FIG. 27 are how a parallel processing is going on at a certain point of time. In stripe 7, the C pass of the previous bit-plane is being processed; in stripes 6, 5 and 4, the S pass, R pass and C pass of the current bit-plane are being processed, respectively; in stripes 3, 2 and 1, the S pass, R pass and C pass of the next current bit-plane (the lowest bit-plane here) are being processed, respectively; and in stripe 0, the first C pass of the next code block is being processed. The register blocks referred to by the respective processing passes are indicated by oblique lines. Actually, the register blocks shaded with the oblique lines are positioned at the left end; in the illustration here, however, the register blocks in each of the register strings are not shifted, and the positions of the register blocks to be referred to are shifted for the simplicity of explanation.

In a parallel processing of different passes, there are possibilities of neighboring pixels overlapping each other in the first and the fifth register. If neighboring pixels are overlapped with each other, the processing will be affected by the updating of the peripheral information. Hence, to prevent the overlapping of neighboring pixels, an adjustment and control is made with upper and lower stripes such that the register blocks to be referred to by the respective processing passes are shifted by 2 horizontally.

For example, there is a difference of 2 blocks between the horizontal position of register block $R_{66}$ to be referred to by S pass in stripe 6 and the horizontal position of register block $R_{54}$ to be referred to by R pass in stripe 5. A dislocation by 2 blocks like this can avoid the overlapping of upper and lower neighboring pixels, which can avoid the effect of any updating of peripheral information.

In a parallel processing of the different passes, control is performed such that the decoding position of the current processing pass is dislocated at least 2 blocks horizontally from the decoding position of the previous pass. Therefore, a timing controller by which to stop the current processing pass and resume the operation with a timing that has a difference of at least 2 blocks is provided to cope with a situation in which the difference in decoding position between upper and lower stripes becomes smaller than 2 blocks.

Figure 28:
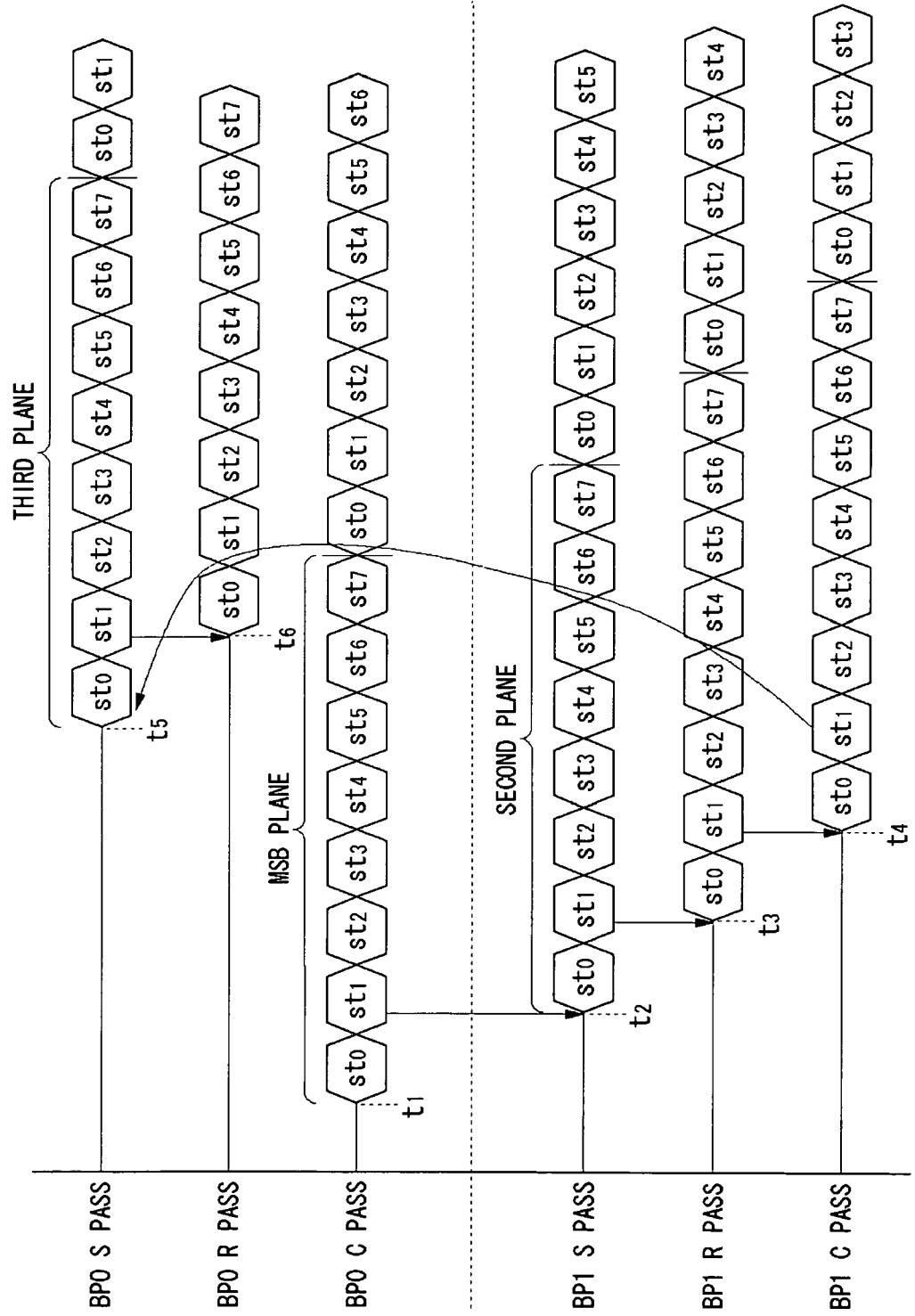
FIG. 28 is a timing chart for explaining the control of decode-start timing of the respective processing passes.

FIG. 28 is a timing chart for explaining the control of decode-start timing of the processing passes. FIG. 28 shows the processing timing of the stripes of the different processing passes by the first bit-plane decoding unit 30a (hereinafter abbreviated as BP0) and the processing timing of the stripes of the different processing passes by the second bit-plane decoding unit 30b (hereinafter abbreviated as BP1).

At time $t_1$, a C pass processing by BP0 over the MSB plane is started. $st_0$ to $st_7$ indicate the processing timing of stripes 0 to 7, respectively. At time $t_2$, an S pass processing by BP1 in the second plane is started. Here, the time $t_2$, when the S pass processing by BP1 starts the decoding of stripe 0 is the time when the C pass processing by BP0 progresses to stripe 1 and the position of the register block to be referred to is 2 blocks apart. This timing control will be explained, using FIG. 29.

Figure 29:
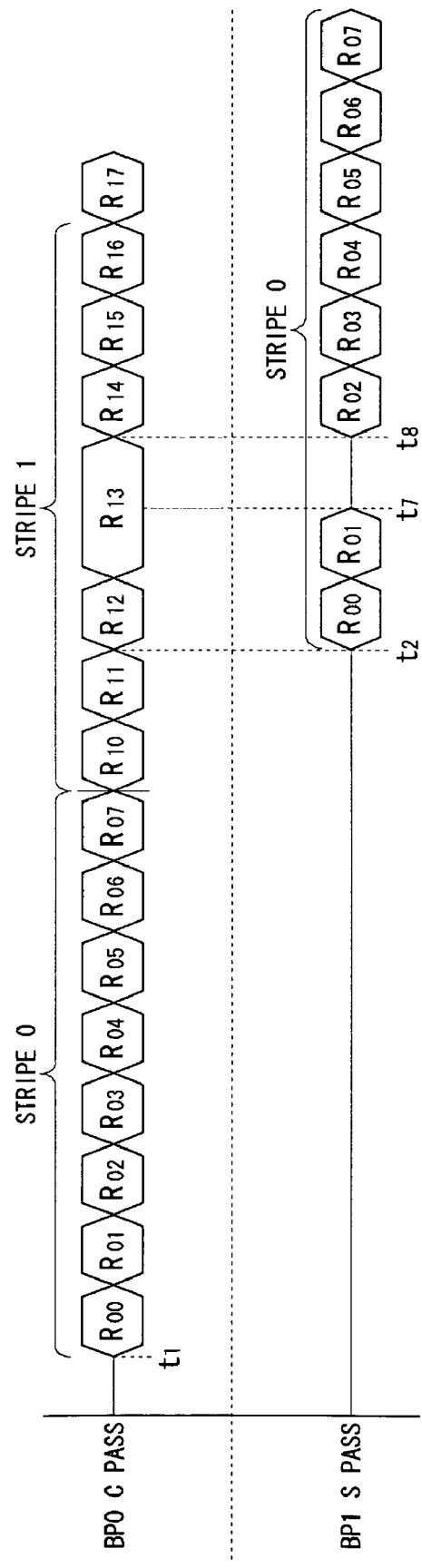
FIG. 29 is a timing chart for explaining the decode-start timing control of FIG. 28 in detail.

FIG. 29 is a timing chart for explaining the decode-start timing control of FIG. 28 in detail. The upper illustration therein represents the timing of decoding of stripe 0 and stripe 1 of C pass by BP0 relative to the register blocks $R_{00}$ to $R_{07}$ and $R_{10}$ to $R_{17}$. The lower illustration therein represents the timing of decoding of stripe 0 of S pass by BP1 relative to the register blocks $R_{00}$ to $R_{07}$.

At time $t_2$, when the C pass processing by BP0 has progressed to the position of the third register block $R_{12}$ of stripe 1, the S pass processing by BP1 is started at the position of the first register block $R_{00}$ of stripe 0. At this time, the decoding positions of the respective passes are 2 blocks apart between stripe 1 and stripe 0, so that there will be no overlapping of the neighboring pixels. From this point on, the C pass processing by BP0 progresses for stripe 1, and the S pass processing by BP1 progresses for stripe 0, with the difference of 2 blocks maintained.

At time $t_7$, in the S pass processing by BP1, the decoding at the position of the second register block $R_{01}$ of stripe 0 comes to an end, whereas, in the C pass processing by BP0, the decoding at the position of the fourth register block $R_{13}$ of stripe 1 is taking time and is not completed yet. At this time, the S pass processing of stripe 0 by BP1 comes to a temporary stop.

At time $t_8$, when the decoding at the position of the fourth register block $R_{13}$ of stripe 1 comes to an end in the C pass processing by BP0, the S pass processing of stripe 0 by BP1 resumes to start the decoding at the position of the third register block $R_{02}$. At this time, the C pass processing of stripe 1 by BP0 starts the decoding at the position of the fifth register block $R_{14}$. By this operation timing control, a separation of 2 blocks is maintained between the C pass processing for stripe 1 and the S pass processing for stripe 0.

Referring back to FIG. 28, at time $t_3$, the R pass by BP1 starts the decoding of stripe 0 of the second plane. Here, the time $t_3$, when the R pass processing by BP1 starts the decoding of stripe 0 is the time when the S pass processing by BP1 progresses to stripe 1 and the position of the register block to be referred to is two blocks apart. This timing control is the same as one in FIG. 29. From here on, the processing advances in a similar manner, and at time $t_4$, the C pass processing by BP1 starts the decoding of stripe 0.

Furthermore, at time $t_5$, when the C pass processing by BP1 has progressed to stripe 1 and the position of the register block to be referred to is 2 blocks ahead, the S pass processing by BP0 starts the decoding of stripe 0 of the third plane. Similarly, at time $t_6$, the R pass processing by BP0 starts the decoding of stripe 0.

In this manner, a parallel processing of the three different passes is carried out by sharing a group of peripheral information registers 20.

Figure 30:
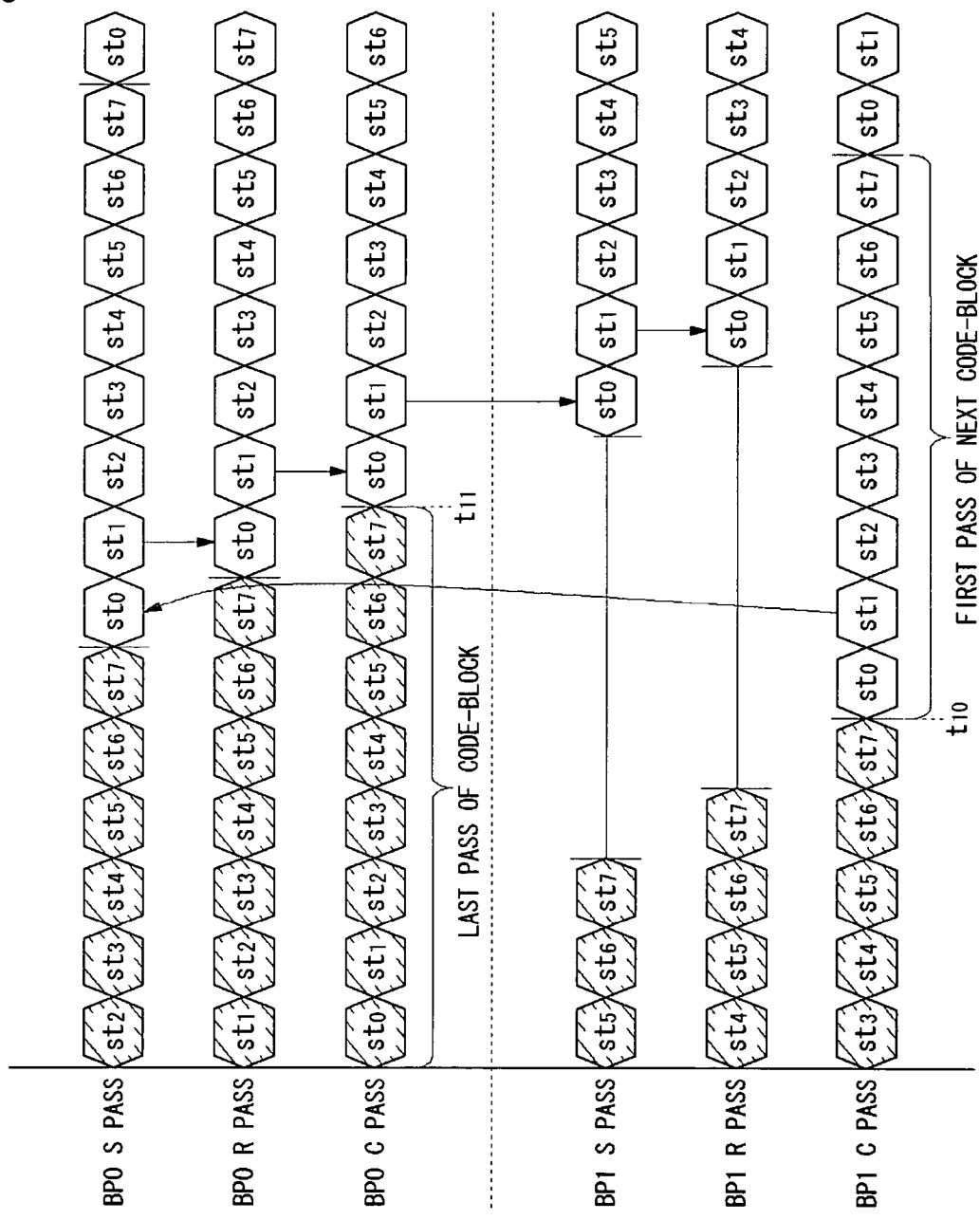
FIG. 30 is a timing chart for explaining the decode-start timing control of code-blocks.

FIG. 30 is a timing chart for explaining the decode-start timing control of code-blocks. The upper half illustrates the timing of decoding of stripes in S pass, R pass and C pass by BP0. The lower half illustrates the timing of decoding of stripes in S pass, R pass and C pass by BP1. While the processings of the current code-block are indicated by oblique lines, those of the next code block are not.

At BP0, the processing progresses in the order of S pass, R pass and C pass for the LSB plane of the current code-block, and at time $t_{11}$, the final C pass processing for the current code-block comes to a completion. On the other hand, at BP1, the processing progresses in the order of S pass, R pass and C pass for the plane right above the LSB of the current code block, and at time $t_{10}$, which is earlier than time $t_{11}$ when the coding of the code block by BP0 ends, the C pass processing for the plane comes to a completion. Hence, without waiting for time $t_{11}$, when the processing of the final pass of the code-block by BP0 ends, BP1 starts the first C pass processing of the next code-block at time $t_{10}$ when the C pass for the plane immediately preceding LSB is completed by BP1. By this operation control, it is possible to perform the C pass processing of the MSB plane of the next code-block earlier and consecutively.

After this, when the C pass processing by BP1 has progressed to stripe 1 of the MSB plane, the S pass processing by BP0 starts from stripe 0 of the next plane. From here on, the R pass processing and the C pass processing by BP0 and further the S pass processing and the R pass processing by BP1 will start in this order. The start timing control of the respective pass processings is the same as explained in FIGS. 28 and 29.

As described above, according to the seventh embodiment, the decoding units 12S, 12R and 12C for their respective passes can accomplish and complete a series of decoding processing in a single cycle by sharing a group of peripheral information registers 20 and, by use of this structure and operation, the arithmetic decoding of bit-planes and passes can be carried out in parallel. The arithmetic decoding is performed while peripheral information is updated, and therefore it is generally considered difficult to parallelize the decoding processing. Yet, according to the present embodiment, the updating of the group of peripheral information registers 20 can be performed in the same cycle as the arithmetic decoding, so that not only a parallel processing of bit-planes but also a complex parallel processing of passes can be accomplished. Moreover, even when the header of a coded image does not contain information on the byte number of the respective passes, a parallel processing of at least bit-planes can be realized.

The present invention has been described based on the embodiments which are only exemplary. It is therefore understood by those skilled in the art that there exist various modifications to the combination of each component and process described above and that such modifications are also encompassed by the scope of the present invention. Such modifications will be described in general hereinbelow.

An image decoding apparatus according to any of the above-described embodiments may be integrally structured with any image coding apparatus that compresses and codes inputted original images using a JPEG2000 scheme. In such a case, the image decoding apparatus and the image coding apparatus may share the same peripheral information registers, and the image coding apparatus may thus be provided with an arithmetic coding structure that uses the same peripheral information registers as in decoding. In coding, however, the contents of the peripheral information registers can be prepared beforehand from original image data, so that it is not necessary to update the contents of the peripheral information registers by the results of operation as in decoding.

An image decoding apparatus according to the above-described embodiments may be incorporated into a digital camera, which includes an image pickup block and an image encoder for carrying out arithmetic coding of a thus-shot image, to be used for the decoding and reproduction of the arithmetic-coded images. Furthermore, an image decoding apparatus according to the above embodiments may be incorporated into a signal processor of a surveillance camera to be used for the decoding and reproduction of the monitoring images encoded in a JPEG2000 scheme. A structure may be such that image data shot and coded by a surveillance camera are sent via a network and an image decoding apparatus connected to the network decodes and reproduces the coded image data received from the network.

An image decoding apparatus according to the sixth embodiment is provided with three decoding units, namely, an S/R/C pass decoding unit 12S, an R pass decoding unit 12R and a C pass decoding unit 12C. However, it may be provided with four decoding units, namely, an S/R/C pass decoding unit 12S, an S pass decoding unit, an R pass decoding unit 12R and a C pass decoding unit 12C. The S pass decoding unit decodes the S pass exclusively. And the S/R/C pass decoding unit 12S specializes in sequential decoding. In this case, when a three-pass parallel decoding processing is selected, the S pass decoding unit, the R pass decoding unit 12R and the C pass decoding unit 12C perform the decoding processing together. Or when a sequential decoding processing is selected, the S/R/C pass decoding unit 12S performs the decoding processing alone. By employing this structure, the switching between a three-pass parallel decoding processing and a sequential decoding processing can be accomplished easily.

Although the present invention has been described by way of exemplary embodiments and modifications, it should be understood that many other changes and substitutions may further be made by those skilled in the art without departing from the scope of the present invention which is defined by the appended claims.

What is claimed is:

1. An image decoding apparatus, including:
   a peripheral information register which stores peripheral information on a pixel when the pixel is decoded;
   a context estimation unit which generates context information for estimating a decoding result of the pixel by reading out the peripheral information from said peripheral information register; and
   a decoding unit which decodes the pixel from the context information generated by said context estimation unit and coded data of the pixel,
   wherein said decoding unit decodes one pixel for each unit decoding period and at the time of termination of the each unit decoding period said decoding unit updates the peripheral information by the decoding result of the pixel that has been decoded during the unit decoding period and then writes back the updated peripheral information to said peripheral information register.

2. An image decoding apparatus according to claim 1, wherein said peripheral information register stores peripheral information on an entire pixel block to be processed, has output bus width which is less than a bit number of the peripheral information to be stored and stores the peripheral information by a ring buffer scheme so that necessary peripheral information is read out sequentially.

3. An image decoding apparatus according to claim 1, wherein in a certain unit decoding period said context estimation unit generates, in advance, context information needed in a next unit decoding period and stores the thus generated context information.

4. An image decoding apparatus, comprising:
   an entropy decoding block which entropy-decodes a coded image;
   an inverse quantization unit which inverse-quantizes entropy-decoded data; and
   an inverse transform unit which performs a spatial-frequency inverse-transform on the inverse-quantized data,
   said entropy decoding block including:
   a peripheral information register which stores peripheral information on a pixel when the pixel is decoded;

a context estimation unit which generates context information for estimating a decoding result of the pixel by reading out the peripheral information from the peripheral information register; and a decoding unit which decodes the pixel from the context information generated by the context estimation unit and coded data of the pixel, wherein the decoding unit decodes one pixel for each unit decoding period and at the time of termination of the each unit decoding period said decoding unit updates the peripheral information by the decoding result of the pixel that has been decoded during the unit decoding period and then writes back the updated peripheral information to the peripheral information register.

5. An image decoding apparatus according to claim 4, wherein the peripheral information register stores peripheral information on an entire pixel block to be processed, has output bus width which is less than a bit number of the peripheral information to be stored and stores the peripheral information by a ring buffer scheme so that necessary peripheral information is read out sequentially.

6. An image decoding apparatus according to claim 4, wherein in a certain unit decoding period the context estimation unit generates, in advance, context information needed in a next unit decoding period and stores the thus generated context information.

* * * * *